United States Patent
Zhang et al.

(10) Patent No.: US 9,077,471 B2
(45) Date of Patent: Jul. 7, 2015

(54) CODE DIVISION MULIPLEXING METHOD, TRANSMITTING DEVICE AND RECEIVING DEVICE USING THE METHOD

(75) Inventors: Zhi Zhang, Beijing (CN); Ming Xu, Beijing (CN); Masayuki Hoshino, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 225 days.

(21) Appl. No.: 13/642,336

(22) PCT Filed: Mar. 22, 2011

(86) PCT No.: PCT/CN2011/072053
§ 371 (c)(1),
(2), (4) Date: Oct. 19, 2012

(87) PCT Pub. No.: WO2011/131071
PCT Pub. Date: Oct. 27, 2011

(65) Prior Publication Data
US 2013/0039162 A1     Feb. 14, 2013

(30) Foreign Application Priority Data
Apr. 23, 2010   (CN) .......................... 2010 1 0158680

(51) Int. Cl.
*H04J 13/00*   (2011.01)
*H04J 13/10*   (2011.01)
*H04J 13/14*   (2011.01)

(52) U.S. Cl.
CPC ......... *H04J 13/0003* (2013.01); *H04J 13/0062* (2013.01); *H04J 13/0059* (2013.01);
(Continued)

(58) Field of Classification Search
USPC .......... 370/208–209, 320, 335, 342, 441, 479
See application file for complete search history.

(56) References Cited

U.S. PATENT DOCUMENTS 5,864,548 A * 1/1999 Liu ................................ 370/320
8,331,474 B2  12/2012 Kawasaki
(Continued)

FOREIGN PATENT DOCUMENTS

CN     1395772 A     2/2003
CN   101388868 A     3/2009
(Continued)

OTHER PUBLICATIONS

International Search Report for Application No. PCT/CN2011/072053 dated Jul. 7, 2011.
R1-093502, 3GPP TSG-RAN WG1#58, NTT DOCOMO, "DL DM-RS Design for Rel. 9 LTE" Aug. 24-28, 2009.
(Continued)

*Primary Examiner* — Michael Thier
*Assistant Examiner* — Eric Myers
(74) *Attorney, Agent, or Firm* — Pearne & Gordon LLP

(57) ABSTRACT

There are provided a code division multiplexing method as well as a transmitting device and a receiving device using the method. The method performs code division multiplexing of a plurality of signals by using a code matrix, the code matrix comprising a plurality of code words, the number of which is the same as the number of the plurality of signals, with each code word comprising a plurality of chips, the method comprising: multiplying each signal of the plurality of signals by each chip of a corresponding code word respectively; and calculating a sum of products of the respective chips in each code word and the corresponding signals to form a plurality of multiplexed signals, wherein, corresponding chips of the respective code words constitute multiple sets of chips, and only one term in differences or sums of any one set of chips and one set of chips among other sets of chips is not zero. The code division multiplexing method as well as the transmitting device and the receiving device according to the present disclosure can make the influence of the selectivity of channels when de-multiplexing is performed small, thus improving the channel transmission quality.

21 Claims, 11 Drawing Sheets

(52) U.S. Cl.
CPC ......... *H04J13/0055* (2013.01); *H04J 13/0066* (2013.01); *H04J 13/007* (2013.01); *H04J 13/14* (2013.01); *H04J 13/10* (2013.01)

(56) References Cited

U.S. PATENT DOCUMENTS

| | | | |
|---|---|---|---|
| 2003/0128657 A1 | 7/2003 | Kuroyanagi et al. | |
| 2006/0268963 A1* | 11/2006 | Yoshida | 375/148 |
| 2009/0232244 A1 | 9/2009 | Kawasaki | |
| 2010/0182988 A1* | 7/2010 | Roh et al. | 370/342 |
| 2010/0272040 A1* | 10/2010 | Nam et al. | 370/329 |

FOREIGN PATENT DOCUMENTS

| | | |
|---|---|---|
| JP | 2002-111505 A | 4/2002 |
| JP | 2002-2111505 A | 4/2002 |
| JP | 2002-164810 A | 6/2002 |
| JP | 2006-339773 A | 12/2006 |
| JP | 2009-225147 A | 10/2009 |

OTHER PUBLICATIONS

Search Report for Chinese Patent Application No. 201180020089.2 dated Oct. 30, 2014.
International Search Report for Application No. PCT/CN2011/072053 dated Jul. 7, 2011 previously submitted on Oct. 19, 2012.

* cited by examiner

FIG. 1

(A): $\begin{bmatrix} 1 & 1 & 1 \\ -1 & 1 & 1 \\ -1 & -1 & 1 \end{bmatrix}$

⇐ First set of chips
⇐ Second set of chips
⇐ Third set of chips

Code word 3 | Code word 2 | Code word 1

(B): 
$S_1$ : $L_1 *(1) + L_2 *(1) + L_3 *(1)$
$S_2$ : $L_1 *(1) + L_2 *(1) + L_3 *(-1)$
$S_3$ : $L_1 *(1) + L_2 *(-1) + L_3 *(-1)$

Code word 1 | Code word 2 | Code word 3

(C): | $S_1$ | | | $S_2$ | | | $S_3$ |

(D):
$S_1 + S_3 \Rightarrow L_1$
$S_2 - S_3 \Rightarrow L_2$
$S_1 - S_2 \Rightarrow L_3$

FIG. 4

(A) $\begin{Bmatrix} \begin{bmatrix} S_1 \\ S_2 \\ S_3 \\ S_4 \end{bmatrix} = \begin{bmatrix} 1 & 1 & 1 & 1 \\ -1 & 1 & 1 & 1 \\ -1 & -1 & 1 & 1 \\ -1 & -1 & -1 & 1 \end{bmatrix} \begin{bmatrix} L_4 \\ L_3 \\ L_2 \\ L_1 \end{bmatrix} \end{Bmatrix}$ Code word 4, Code word 3, Code word 2, Code word 1

$S_1 = L_1*(1) + L_2*(1) + L_3*(1) + L_4*(1)$ $S_2 = L_1*(1) + L_2*(1) + L_3*(1) + L_4*(-1)$ $S_3 = L_1*(1) + L_2*(1) + L_3*(-1) + L_4*(-1)$ $S_4 = L_1*(1) + L_2*(-1) + L_3*(-1) + L_4*(-1)$ (B)

| $S_1$ | | | $S_2$ | | | $S_3$ | | | $S_4$ |

(C)

(D) $\begin{cases} S_1 - S_2 \longrightarrow L_4 \\ S_2 - S_3 \longrightarrow L_3 \\ S_3 - S_4 \longrightarrow L_2 \\ S_1 + S_4 \longrightarrow L_1 \end{cases}$

FIG. 5

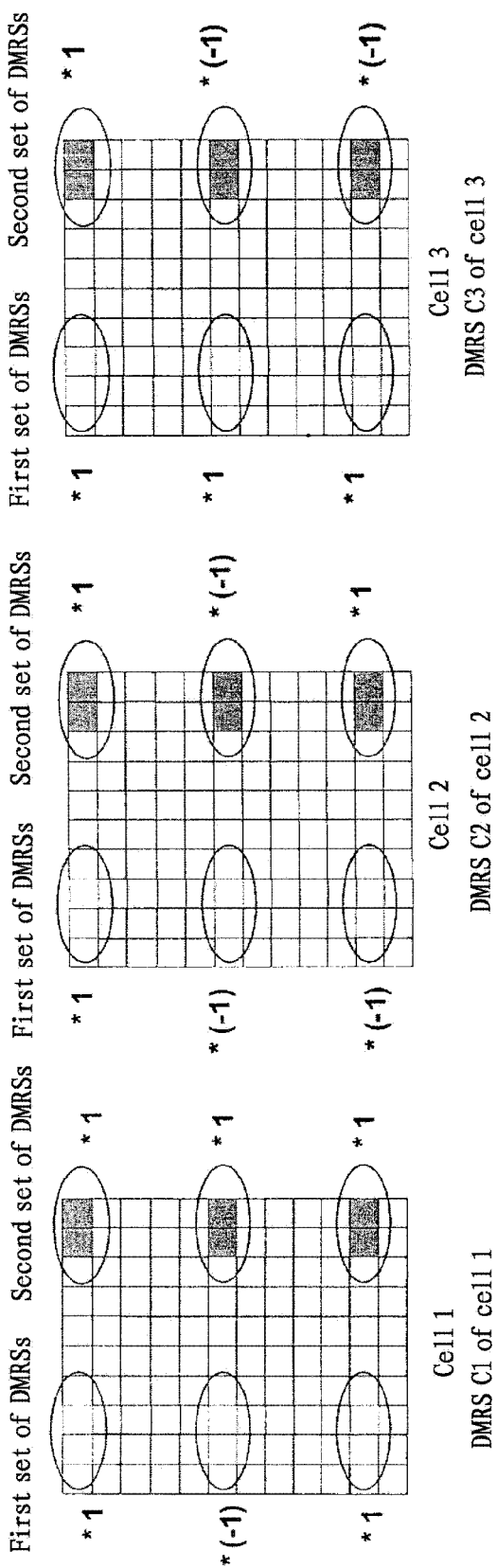
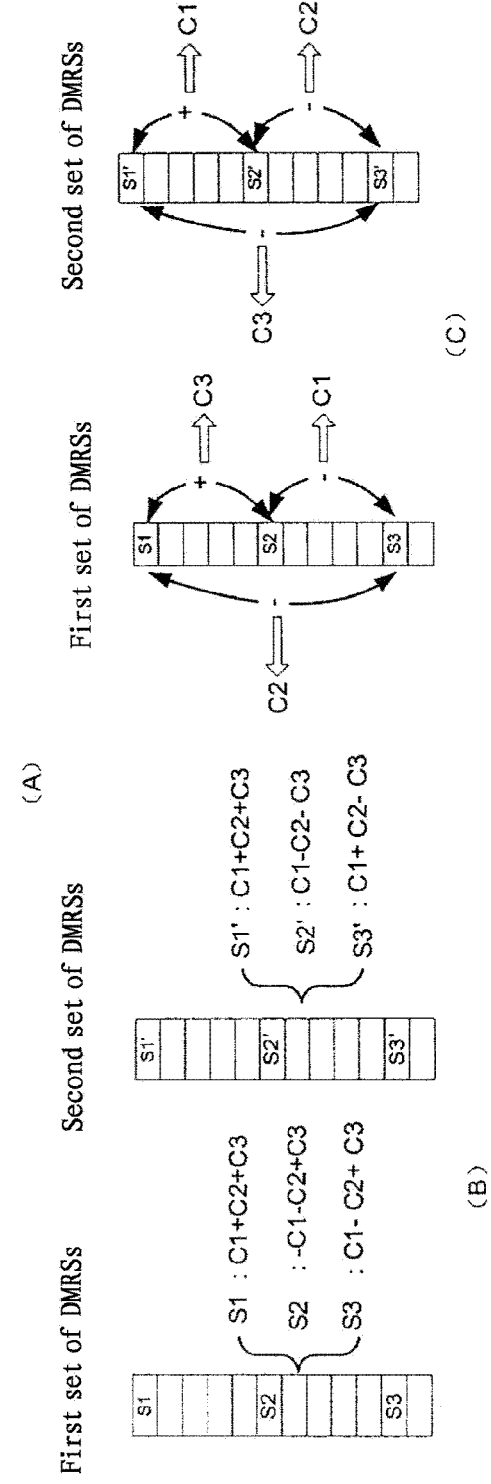
FIG. 10

CODE DIVISION MULIPLEXING METHOD, TRANSMITTING DEVICE AND RECEIVING DEVICE USING THE METHOD

TECHNICAL FIELD

The present disclosure relates to signal multiplexing method and reference signal design in the communication field.

BACKGROUND ART

Code Division Multiplexing (CDM) techniques are widely applied in the technical field of wireless communication. The most classical CDM technique is to expand different signals by using different orthogonal sequences, and superpose them so as to eliminate interferences between the superposed signals by means of orthogonal property among the different sequences. Because of this advantage, CDM techniques are widely applied for multiplexing different signals in a communication system.

FIG. 1(A) to FIG. 1(D) are diagrams showing the principle of the CDM multiplexing using four-dimension Walsh codes. As shown in FIG. 1(A), the code words used in CDM are orthogonal to each other, which means the correlations among different code words are zero. As shown in FIG. 1(B), in CDM multiplexing, different signals S1, S2, S3, S4 correspond to the different code words respectively, and those different signals are multiplied by the corresponding code words respectively. The results of the multiplication produce expansions of signals. Expansions produced by the different signals are superposed to form multiplexed signals W, X, Y, Z. As shown in FIG. 1(C), the multiplexed signals W, X, Y, Z are transmitted on communication channels. Expansions of signals by CDM may be performed either on time domain or frequency domain. As shown in FIG. 1(D), in CDM de-multiplexing, the signals are correlated with the different code words to recover the original signals S1, S2, S3, S4.

In the CDM multiplexing using orthogonal codes, the orthogonality among different orthogonal code words is the most essential characteristic. In wireless communication, the most widely used orthogonal code is Walsh code, but the length of such code can only be 2, 4, 8, 16 . . . (power of 2). For the orthogonal sequences with other lengths, other construction methods are used. For example, an orthogonal sequence with a length of 3 may be obtained by a 3*3 Fourier Transform matrix.

In CDM multiplexing, signals before multiplexing are expanded by the CDM code words in the procedure of multiplexing. In a communication system, such expansion may be either on the time domain or on the frequency domain. The orthogonality requires the channels where the expanded signals are superposed to be flat (invariable). However, due to the selectivity of time and frequency of the communication channels, such a flat property is not always obtained. If the selectivity exists in the channels after expansion, in the CDM de-multiplexing, the orthogonality between the different code words is deteriorated. The stronger the selectivity is, the severer such deterioration is. Further, due to characteristics of the orthogonal codes, the CDM de-multiplexing has to correlate all signals after expansion, thereby increasing the difficulty of the CDM de-multiplexing.

SUMMARY OF THE DISCLOSURE

If a code multiplexing method can be found so that the CDM de-multiplexing does not need to correlate all expanded signals, then the influence of selectivity on time and frequency domains of the communication channels on the CDM de-multiplexing may be reduced. The present disclosure is made in consideration of the above aspects.

According to one aspect of the present disclosure, there is provided a code division multiplexing method for performing the code division multiplexing of multiple signals by using a code matrix, the code matrix comprising multiple code words, the number of which is the same as the number of the multiple signals, with each code word comprising multiple chips, the method comprising: multiplying each signal of the multiple signals by each chip of a corresponding code word respectively; and calculating a sum of products of the respective chips in each code word and the corresponding signals to form multiple multiplexed signals, wherein the corresponding chips of the respective code words constitute multiple sets of chips, and only one term in differences or sums of any one set of chips and one set of chips among other sets of chips is not zero.

According to another aspect of the present disclosure, there is provided a de-multiplexing method, comprising: receiving multiple multiplexed signals which are obtained by performing the code division multiplexing of multiple signals by using a code matrix; and calculating the differences or sums of multiple pairs of the multiplexed signals of the multiple multiplexed signals to obtain the respective signals of the multiple signals.

According to a further aspect of the present disclosure, there is provided a transmitting device for performing the code division multiplexing of multiple signals by using a code matrix, the code matrix comprising the multiple code words, the number of which is the same as the number of the multiple signals, with each code word comprising multiple chips, the transmitting device comprising: a multiplexing unit for multiplying each signal of the multiple signals by each chip of a corresponding code word respectively, and calculating a sum of products of the respective chips in each code word and the corresponding signals to form multiple multiplexed signals; and a transmitting unit for transmitting the multiple multiplexed signals, wherein the corresponding chips of the respective code words constitute multiple sets of chips, and only one term in differences or sums of any one set of chips and one set of chips among other sets of chips is not zero.

According to a still further aspect of the present disclosure, there is provided a receiving device, comprising: a receiving unit for receiving multiple multiplexed signals which are obtained by performing the code division multiplexing of multiple signals by using a code matrix; and a de-multiplexing unit for calculating differences or sums of multiple pairs of multiplexed signals of the multiple multiplexed signals to obtain the respective signals of the multiple signals.

The code division multiplexing method based on the differential coding and the corresponding transmitting device and receiving device according to the present disclosure can make the influence of the selectivity of channels when the de-multiplexing is performed small and thus channel transmission quality is improved.

BRIEF DESCRIPTION OF THE DRAWINGS

These and/or other aspects and advantages of the present disclosure will become more distinct and more easier to be understood in a detailed description of the embodiments of the present disclosure in combination with attached drawings, in which:

FIG. 1(A) to FIG. 1(D) are diagrams showing the principle of the CDM multiplexing using four-dimension Walsh codes;

FIG. 4(A) to FIG. 4(D) are diagrams showing a method of multiplexing and de-multiplexing by using a differential code matrix with a length of 3 according to one embodiment of the present disclosure;

FIG. 5(A) to FIG. 5(D) are diagrams showing a method of multiplexing and de-multiplexing by using a differential code matrix with a length of 4 according to one embodiment of the present disclosure;

FIG. 10(A) to FIG. 10(C) are diagrams showing a further example of the code division multiplexing and de-multiplexing of the demodulation reference signals of the adjacent cells based on a differential coding mode according to one embodiment of the present disclosure;

DESCRIPTION OF THE EMBODIMENTS

Figure 2:
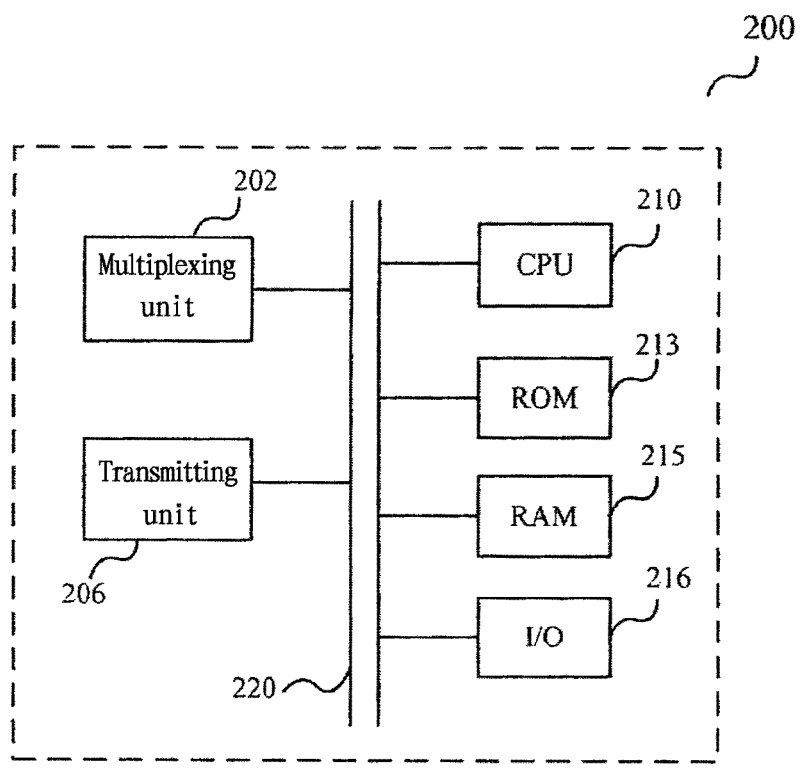
FIG. 2 is a block diagram showing a transmitting device of a communication system according to the present disclosure.

In the following, some specific embodiments of the present disclosure will be described in detail with reference to the attached drawings. If the detailed description of some related prior art may confuse the main points of the disclosure, the detailed description thereof will not be provided here. In the respective embodiments, the identical reference numerals are used to denote elements or units performing same functions.

The present disclosure proposes a method of CDM multiplexing and de-multiplexing based on the differential coding, a transmitting device and a receiving device applying such method in a wireless communication system.

First Embodiment

FIG. 2 is a block diagram showing a transmitting device of a wireless communication system according to an embodiment of the present disclosure.

As shown in FIG. 2, a transmitting device 200 according to the present disclosure includes a multiplexing unit 202 and a transmitting unit 206 connected with each other.

The transmitting device 200 according to the present disclosure may further include: a Center Processing Unit (CPU) 210 for executing related programs to process various data and to control operations of respective units of the device 200; a Read Only Memory (ROM) 213 for storing various programs required for the CPU 210 to perform various process and control; a Random Access Memory (RAM) 215 for storing intermediate data temporarily produced by the CPU 210 in the procedure of process and control; a Input/Output (I/O) unit 216 for connecting with external devices, transporting various data between the external devices and the transmitting device 200 and so on. The above multiplexing unit 202, transmitting unit 206, CPU 210, ROM 213, RAM 215, I/O unit 216, etc may be connected via a data and/or command bus 220, and transfer signals between one another.

The respective units as described above do not limit the scope of the present disclosure. According to one embodiment of the present disclosure, the function of either of the multiplexing unit 202 and the transmitting unit 206 may also be realized by functional software in combination with the above CPU 210, ROM 213, RAM 215, I/O unit 216 and the like. And, the functions of the multiplexing unit 202 and the transmitting unit 206 may also be realized by combining into one unit.

The transmitting device 200 performs the code division multiplexing of multiple original signals by using a code matrix including multiple code words, the number of which is the same as the number of the multiple original signals, with each of code words including multiple chips. The multiplexing unit 202 multiplies each of the multiple original signals by each of chips of corresponding code words respectively, and adds up the products of respective chips of each of the code words and the corresponding original signals to form multiple multiplexed signals. The transmitting unit 206 transmits out the multiple multiplexed signals through the transmitting device 200. According to one embodiment of the present disclosure, respective chips of the respective code words may constitute multiple sets of chips, in which among differences or sums of any one set of chips and at least one set of chips among other sets of chips, there is only one term being non-zero.

For example, the code matrix is a matrix A of N×M, the multiple original signals as described above are M signals $L_1$, $L_2$, ..., $L_M$, the code matrix A includes M code words $[a_{i,1}]$, $[a_{i,2}]$, ..., $[a_{i,M}]$, and the respective chips of the respective code words constitute N sets of chips $[a_{1,j}]$, $[a_{2,j}]$, ..., $[a_{N,j}]$. Here, i=1...N, j=1...M, M and N are positive integers larger than or equal to 2, and M≤N. The multiple multiplexed signals are N signals $S_1$, $S_2$, ..., $S_N$, in which $$S_1 = L_1 \times a_{1,1} + L_2 \times a_{1,2} + \ldots + L_M \times a_{1,M};$$

$$S_2 = L_1 \times a_{2,1} + L_2 \times a_{2,2} + \ldots + L_M \times a_{2,M};$$

$$S_N = L_1 \times a_{N,1} + L_2 \times a_{N,2} + \ldots + L_M \times a_{N,M}.$$

According to one embodiment of the present disclosure, the above code matrix A may be constructed as follows:

$$A = [a_{i,j}] \quad (1)$$

$$a_{i,j} = \begin{cases} b, & i \leq j \\ -b, & i > j \end{cases} \text{ or } \begin{cases} b, & i \geq j \\ -b, & i < j \end{cases}$$

In the equation (1), b can be any number other than zero, for example, any real number or complex number other than zero. For the sake of convenience, it can be taken as b=1.

At this time, the matrix A is a symmetric matrix, that is, M=N. For example, it can be known according to the above equation (1) that a differential code matrix with a length of 3 is as follows:

$$A_{3\times 3} = \begin{bmatrix} 1 & 1 & 1 \\ -1 & 1 & 1 \\ -1 & -1 & 1 \end{bmatrix} \quad (2)$$

In addition to the above, an example of a differential code matrix with a longer length may also be obtained according to the equation (1).

The above construction manner of the code matrix A does not limit the scope of the present disclosure, and the code matrix A may also be constructed by using other methods, as long as the condition that only one term in differences or sums of any one set of chips and at least one set of chips among other sets of chips is nonzero is satisfied.

The transmitting device based on the differential coding according to the present disclosure can make the influence of the selectivity of channels when de-multiplexing small, thus improving the channel transmission quality.

Second Embodiment

Figure 3:
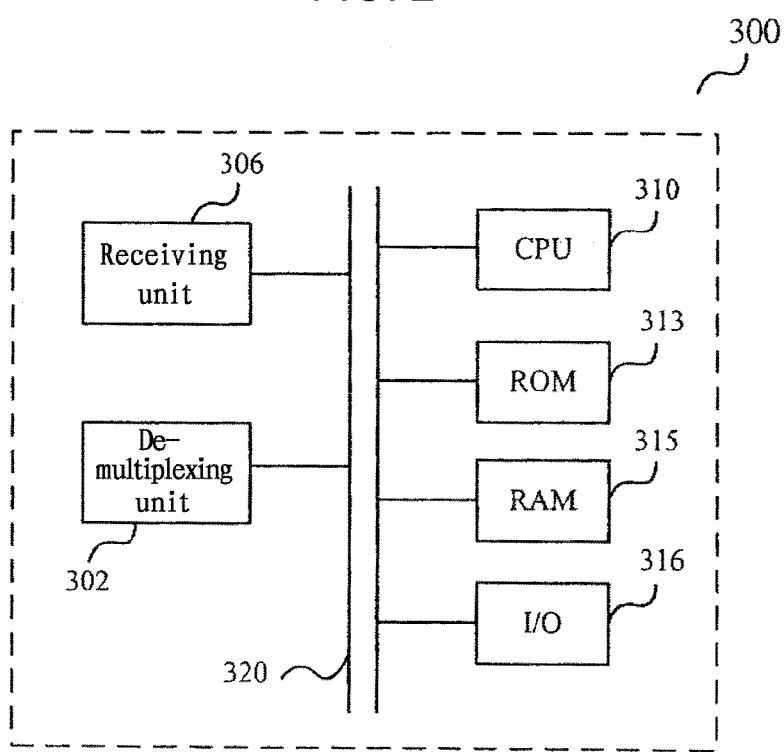
FIG. 3 is a block diagram showing a receiving device of a communication system according to the present disclosure.

FIG. 3 is a block diagram showing a receiving device of a wireless communication system according to an embodiment of the present disclosure.

As shown in FIG. 3, a receiving device 300 according to the present disclosure includes a de-multiplexing unit 302 and a receiving unit 306 connected with each other.

The receiving device 300 according to the present disclosure may further include: a Center Processing Unit (CPU) 310 for executing related programs to process various data and to control operations of respective units of the device 300; a Read Only Memory (ROM) 313 for storing various programs required for the CPU 310 to perform various process and control; a Random Access Memory (RAM) 315 for storing intermediate data temporarily produced by the CPU 310 in the procedure of the process and control; a Input/Output (I/O) unit 316 for connecting with external devices, transporting various data between the external devices and the receiving device 300 and so on. The above de-multiplexing unit 302, receiving unit 306, CPU 310, ROM 313, RAM 315, I/O unit 316, etc may be connected via a data and/or command bus 320, and transfer signals between one another.

The respective units as described above do not limit the scope of the present disclosure. According to one embodiment of the present disclosure, the function of either of the de-multiplexing unit 302 and the receiving unit 306 may also be realized by functional software in combination with the above CPU 310, ROM 313, RAM 315, I/O unit 316 and the like. And, the functions of the de-multiplexing unit 302 and the receiving unit 306 may also be realized by combining into one unit.

The receiving unit 306 of the receiving device 300 of the present disclosure receives multiple multiplexed signals obtained by using a code matrix to perform code division multiplexing of multiple original signals. The de-multiplexing unit 302 calculates differences or sums of each pair of multiplexed signals in the received multiple multiplexed signals so as to obtain respective original signals in the multiple original signals.

The above code matrix includes a number of code words each of which includes multiple chips, and the number of the code words is the same as the number of the multiple original signals. The multiple multiplexed signals is formed by multiplying each of the multiple original signals by each of chips of corresponding code words respectively, and calculating sums of products of respective chips of each of the code words and the corresponding signals. For example, the code matrix is a matrix A of N×M, the multiple original signals as described above are M signals $L_1, L_2, \ldots, L_M$, the code matrix A includes M code words $[a_{i,1}], [a_{i,2}], \ldots, [a_{i,M}]$, and respective chips of the respective code words constitute N sets of chips $[a_{1,j}], [a_{2,j}], \ldots, [a_{N,j}]$. Here, $i=1 \ldots N$, $j=1 \ldots M$, M and N are positive integers larger than or equal to 2, and M≤N. The multiple multiplexed signals are N signals $S_1, S_2, \ldots, S_N$, in which $S_1 = L_1 \times a_{1,1} + L_2 \times a_{1,2} + \ldots + L_M \times a_{1,M}$;

$S_2 = L_1 \times a_{2,1} + L_2 \times a_{2,2} + \ldots + L_M \times a_{2,M}$;

$S_N = L_1 \times a_{N,1} + L_2 \times a_{N,2} + \ldots + L_M \times a_{N,m}$.

According to one embodiment of the present disclosure, the above code matrix A may be constructed as shown in the equation (1). And, the above construction manner of the code matrix A does not limit the scope of the present disclosure, and the code matrix A may also be constructed by using other methods, as long as the condition that only one term in differences or sums of any one set of chips and at least one set of chips among other sets of chips is nonzero is satisfied.

The receiving device based on the differential coding according to the present disclosure can make the influence of the selectivity of channels when de-multiplexing small, thus improving the channel transmission quality.

Third Embodiment

FIG. 4(A) to FIG. 4(D) are diagrams showing a method of code division multiplexing and de-multiplexing by using a differential code matrix with a length of 3 according to one embodiment of the present disclosure.

As shown in FIG. 4(A), the differential code matrix with a length of 3 is as shown in the above equation (2). The differential code matrix includes three code words which are code word 1 [1, 1, 1], code word 2 [1, 1, −1] and code word 3 [1, −1, −1] respectively. Each code word further includes multiple chips, in which the code word 1 contains chips 1, 1 and 1, the code word 2 contains chips 1, 1 and −1, and the code word 3 contains chips 1, −1 and −1. According to an embodiment of the present disclosure, the first chips in all the code words are called as the first set of chips, the second chips in all the code words are called as the second set of chips, and the third chips in all the code words are called as the third set of chips. It can by easily seen from FIG. 4(A) that only one term is not zero in the differences of adjacent two sets of chips, and only one term is not zero in the sum of two sets of chips the distance of which is the farthest.

As shown in FIG. 4(B), in the CDM multiplexing performed by the transmitting device 200 according to the present disclosure by using a differential code matrix, different original signals L1, L2, L3 correspond to different code words respectively. The multiplexing unit 202 multiplies the different signals by corresponding code words respectively. Specifically, the multiplexing unit 202 multiplies each signal by each chip of the corresponding code word, for example, it multiplies the first signal L1 by each chip of the code word 1 respectively to get [L1*(1), L1*(1), L1*(1)], it multiplies the second signal L2 by each chip of the code word 2 respectively to get [L2*(1), L2*(1), L2*(−1)], and it multiplies the third signal L3 by each chip of the code word 3 respectively to get [L3*(1), L3*(−1), L3*(−1)]. The results of multiplications lead to expansions of signals. The multiplexing unit 202 then adds up the expansions produced by different signals so as to form the multiplexed signals S1, S2 and S3. Specifically, the products of the respective chips in each code word and the corresponding signals are added up to form multiple multiplexed signals. For example, respective product terms belonging to the first set of chips in respective code words are added up so as to obtain the multiplexed signal S1=L1*(1)+L2*(1)+L3*(1), respective product terms belonging to the second set of chips in respective code words are added up so as to obtain the multiplexed signal S2=L1*(1)+L2*(1)+L3*(−1), and respective product terms belonging to the third set of chips in respective code words are added up so as to obtain the multiplexed signal S3=L1*(1)+L2*(−1)+L3*(−1). Thereby, the multiplexed signals S1, S2 and S3 are obtained.

As shown in FIG. 4(C), the transmitting unit 206 transports the multiplexed signals S1, S2 and S3 on a communication channel. The expansions of signals by CDM may be performed either on time domain or on frequency domain.

As shown in FIG. 4(D), in the CDM de-multiplexing of the receiving device 300 according to the present disclosure, subtraction is operated between adjacent multiplexed signals S1 and S2 to obtain a chip term containing only the original signal L3, so that the original signal L3 may be obtained by calculation. Similarly, subtraction is operated between adjacent multiplexed signals S2 and S3 to obtain a chip term containing only the original signal L2, so that the original signal L2 may be obtained by calculation. The multiplexed signals S1 and S3 the distance of which is the farthest is added up to obtain a chip term containing only the original signal L1, so that the original signal L1 may be obtained by calculation. Thereby, the respective original signals L1, L2 and L3 may be obtained through the differential detection.

The present method is based on the differential detection. As shown in FIG. 4(D), in the differential detection on the three signals, two signals need to detect only the adjacent multiplexed signals, for example (S1-S2) and (S2-S3). In this way, the span distance on time or frequency domain when de-multiplexing is short, so that the influence of variation of channels on the time or frequency domain is small.

Figure 1:
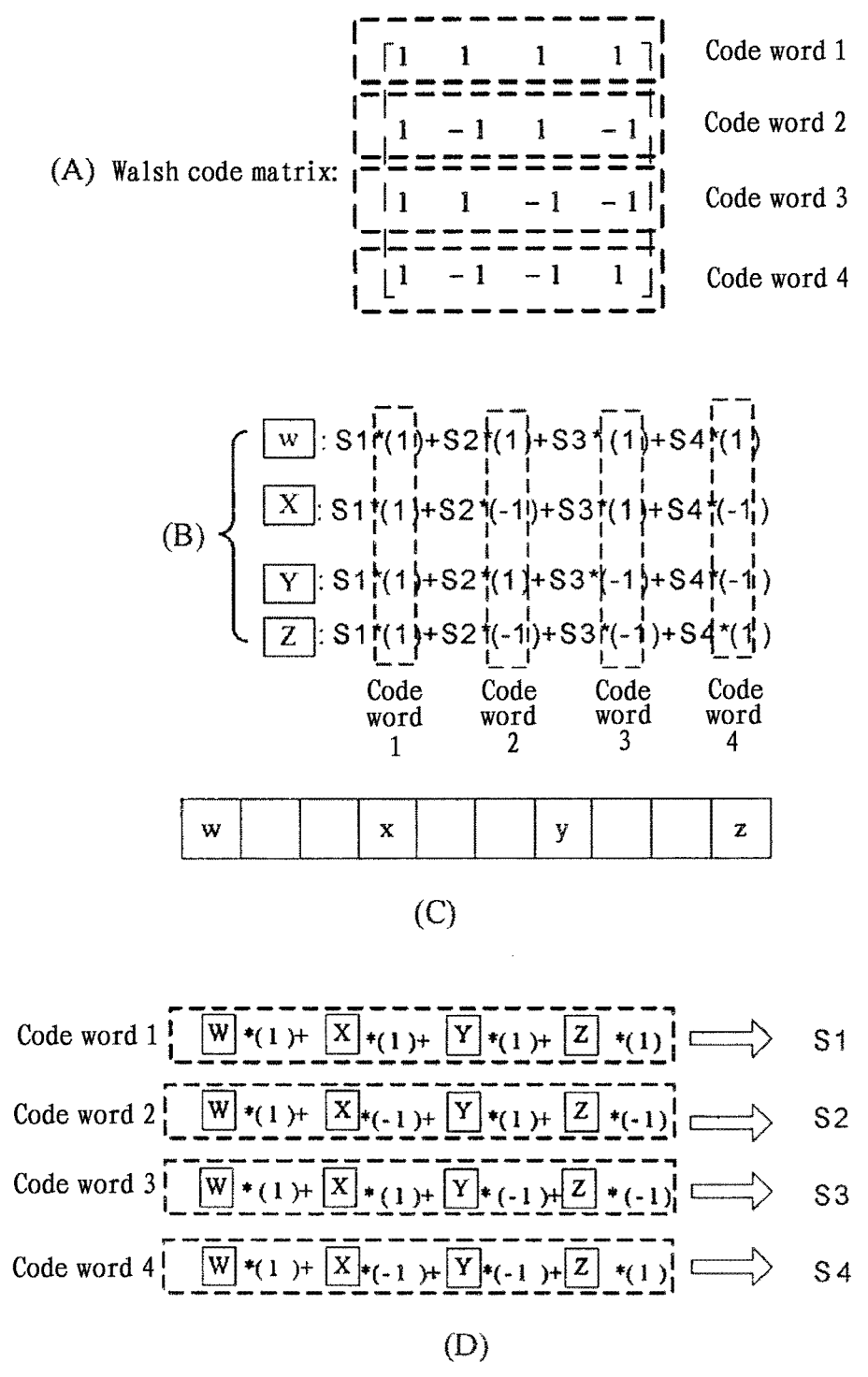

Compared with conventional CDM methods based on orthogonal codes, the method based on the differential codes used by the transmitting device 200 and the receiving device 300 of the present disclosure has at least two differences: (1) the differential codes of the present method and the orthogonal codes are two different types of codes. The correlation between different code words of the differential codes may not be zero, that is, there is no orthogonal property between the code words of the differential codes, while the orthogonal property between the code words is the most essential characteristic of the orthogonal codes; (2) the de-multiplexing of the present method is based on the differential detection instead of the coherent detection, and if the coherent detection method as shown in FIG. 1 is applied in FIG. 4 according to the present disclosure, the original signals before multiplexing cannot be correctly detected.

The differential code matrix with a length of 3 in FIG. 4 may be easily expanded to an arbitrary length larger than 3, for example, it can be known from the equation (1) that a differential code matrix with a length of 4 is as follows:

$$A_{4\times 4} = \begin{bmatrix} 1 & 1 & 1 & 1 \\ -1 & 1 & 1 & 1 \\ -1 & -1 & 1 & 1 \\ -1 & -1 & -1 & 1 \end{bmatrix} \quad (3)$$

FIG. 5(A) to FIG. 5(D) are diagrams showing a method of multiplexing and de-multiplexing by using a differential code matrix with a length of 4 according to one embodiment of the present disclosure.

As shown in FIG. 5(A), the differential code matrix includes 4 code words which are code word 1[1, 1, 1, 1], code word 2[1, 1, 1, −1], code word 3[1, 1, −1, −1] and code word 4[1, −1, −1, −1] respectively. Each code word further includes multiple chips, in which the code word 1 contains chips 1, 1, 1 and 1, the code word 2 contains chips 1, 1, 1 and −1, the code word 3 contains chips 1, 1, −1 and −1, and code word 4 contains chips 1, −1, −1 and −1. According to an embodiment of the present disclosure, the first chips in all the code words are called as the first set of chips, the second chips in all the code words are called as the second set of chips, the third chips in all the code words are called as the third set of chips, and the fourth chips in all the code words are called as the fourth set of chips. It can be easily seen from FIG. 5(A) that only one term is not zero in differences of adjacent two sets of chips, and only one term is not zero in sum of two sets of chips the distance of which is the farthest.

In the CDM multiplexing performed by the transmitting device 200 according to the present disclosure by using a differential code matrix, different original signals L1, L2, L3, L4 correspond to different code words respectively. The multiplexing unit 202 multiplies the different signals by corresponding code words respectively. Specifically, each signal is multiplied by each chip of the corresponding code word. For example, the first signal L1 is multiplied by each chip of the code word 1 respectively to get [L1*(1), L1*(1), L1*(1), L1*(1)], the second signal L2 is multiplied by each chip of the code word 2 respectively to get [L2*(1), L2*(1), L2*(1), L2*(−1)], the third signal L3 is multiplied by each chip of the code word 3 respectively to get [L3*(1), L3*(1), L3*(−1), L3*(−1)], and the fourth signal L3 is multiplied by each chip of the code word 4 respectively to get [L4*(1), L4*(−1), L4*(−1), L4*(−1)]. The results of multiplications lead to expansions of signals. The multiplexing unit 202 then adds up the expansions produced by different signals so as to form the multiplexed signals S1, S2, S3 and S4. Specifically, the multiplexing unit 202 adds up the products of respective chips in each code word and the corresponding signals to form multiple multiplexed signals. For example, respective product terms belonging to the first set of chips in respective code words are added up so as to obtain the multiplexed signal S1=L1*(1)+L2*(1)+L3*(1)+L4*(1), respective product terms belonging to the second set of chips in respective code words are added up so as to obtain the multiplexed signal S2=L1*(1)+L2*(1)+L3*(1)+L4*(−1), respective product terms belonging to the third set of chips in respective code words are added up so as to obtain the multiplexed signal S3=L1*(1)+L2*(1)+L3*(−1)+L4*(−1), and respective product terms belonging to the fourth set of chips in respective code words are added up so as to obtain the multiplexed signal S4=L1*(1)+L2*(−1)+L3*(−1)+L4*(−1). Thereby, the multiplexed signals S1, S2, S3 and S4 are obtained as shown in FIG. 5(B).

As shown in FIG. 5(C), the transmitting unit 206 transports the multiplexed signals S1, S2, S3 and S4 on a wireless channel. The expansions of signals by CDM may be performed either on time domain or on frequency domain.

As shown in FIG. 5(D), in the CDM de-multiplexing of the receiving device 300 according to the present disclosure, subtraction is operated by the de-multiplexing unit 302 between adjacent multiplexed signals S1 and S2 to obtain a chip term containing only the original signal L4, so that the original signal L4 may be obtained by calculation. Similarly, the subtraction is operated between adjacent multiplexed signals S2 and S3 to obtain a chip term containing only the original signal L3, so that the original signal L3 may be obtained by calculation. The subtraction is operated between adjacent multiplexed signals S3 and S4 to obtain a chip term containing only the original signal L2, so that the original signal L2 may be obtained by calculation. The multiplexed signals S1 and S4 the distance of which is the farthest are added up to obtain a chip term containing only the original signal L1, so that the original signal L1 may be obtained by calculation. Thereby, respective original signals L1, L2, L3 and L4 may be obtained through the differential detection.

Based on the embodiments shown in the above FIG. 4 and FIG. 5, it is not difficult to find that the de-multiplexing method (differential detections) according to the embodiments of the present disclosure uses only two adjacent expanded signals, while the de-multiplexing method (coherent detections) shown in FIG. 1 of the prior art uses all four expanded signals. Thus, the influence of channels on the methods in FIG. 4 and FIG. 5 according to the embodiments of the present disclosure is smaller.

It should be noted that the above method of constructing the differential code matrixes does not limit the scope of the disclosure, and there are construction methods for the differential code matrixes with certain lengths. For example, for the differential code matrixes with a length of 3, they can also be constructed as follows:

$$\begin{bmatrix} 1 & 1 & -1 \\ -1 & 1 & 1 \\ 1 & 1 & 1 \end{bmatrix}, \begin{bmatrix} 1 & 1 & -1 \\ -1 & 1 & 1 \\ -1 & -1 & -1 \end{bmatrix}, \begin{bmatrix} 1 & 1 & -1 \\ -1 & 1 & 1 \\ -1 & 1 & -1 \end{bmatrix}, \begin{bmatrix} 1 & 1 & -1 \\ -1 & 1 & 1 \\ 1 & -1 & 1 \end{bmatrix}, \begin{bmatrix} 1 & 1 & 1 \\ 1 & -1 & -1 \\ 1 & 1 & -1 \end{bmatrix} \quad (4)$$

It is not difficult to find that the other differential code matrixes may be obtained by permuting the rows or columns of any matrix in the equation (4).

In addition, a differential code matrix may also be constructed such that M of a matrix of M×N is not equal to N. For example, one code word, e.g. the code word 1, is removed from the differential code matrix with a length of 4 in the equation (3), it can be obtained as below:

$$A_{4\times 3} = \begin{bmatrix} 1 & 1 & 1 \\ -1 & 1 & 1 \\ -1 & -1 & 1 \\ -1 & -1 & -1 \end{bmatrix} \quad (5)$$

At this time, there are only three code words, which can be used to multiplex three signals, in the above differential code matrix. When the de-multiplexing is performed, the multiplexed signals with the farthest distance are no longer required to be detected, but it is required to detect only the multiplexed signals adjacent with each other.

For example, the differential code matrix includes 3 code words which are code word 1[1, 1, 1, −1], code word 2[1, 1, −1, −1] and code word 3[1, −1, −1, −1] respectively. The code word 1 contains chips 1, 1, 1 and −1, the code word 2 contains chips 1, 1, −1 and −1, and code word 3 contains chips 1, −1, −1 and −1. According to an embodiment of the present disclosure, the first chips in all the code words are called as the first set of chips, the second chips in all the code words are called as the second set of chips, the third chips in all the code words are called as the third set of chips, and the fourth chips in all the code words are called as the fourth set of chips. It can be seen from above that only one term is not zero in differences of adjacent two sets of chips, and all terms are zero in sum of two sets of chips the distance of which is the farthest.

In the CDM multiplexing performed by the transmitting device 200 according to the present disclosure by using the above 4×3 differential code matrix, three different original signals L1, L2, L3 can be multiplexed which correspond to different code words respectively. The multiplexing unit 202 multiplies the different signals by corresponding code words respectively. Specifically, the multiplexing unit 202 multiplies each signal by each chip of the corresponding code word. For example, the first signal L1 is multiplied by each chip of the code word 1 respectively to get [L1*(1), L1*(1), L1*(1), L1*(−1)], the second signal L2 is multiplied by each chip of the code word 2 respectively to get [L2*(1), L2*(1), L2*(−1), L2*(−1)], and the third signal L3 is multiplied by each chip of the code word 3 respectively to get [L3*(1), L3*(−1), L3*(−1), L3*(−1)]. The results of multiplications lead to expansions of signals. The multiplexing unit 202 then adds up the expansions produced by different signals so as to form multiplexed signals S1, S2, S3 and S4. Specifically, products of respective chips in each code word and the corresponding signals are added up to form multiple multiplexed signals. For example, respective product terms belonging to the first set of chips in respective code words are added up so as to obtain the multiplexed signal S1=L1*(1)+L2*(1)+L3*(1), respective product terms belonging to the second set of chips in respective code words are added up so as to obtain the multiplexed signal S2=L1*(1)+L2*(1)+L3*(−1), respective product terms belonging to the third set of chips in respective code words are added up so as to obtain the multiplexed signal S3=L1*(1)+L2*(−1)+L3*(−1), and respective product terms belonging to the fourth set of chips in respective code words are added up so as to obtain the multiplexed signal S4=L1*(−1)+L2*(−1)+L3*(−1). Thereby, the multiplexed signals S1, S2, S3 and S4 are obtained.

The transmitting unit 206 transports the multiplexed signals S1, S2, S3 and S4 on a wireless channel. The expansions of signals by CDM may be performed either on time domain or on frequency domain.

In the CDM de-multiplexing of the receiving device 300 according to the present disclosure, a subtraction is operated by the de-multiplexing unit 302 between adjacent multiplexed signals S1 and S2 to obtain a chip term containing only the original signal L3, so that the original signal L3 may be obtained by calculation. Similarly, a subtraction is operated between adjacent multiplexed signals S2 and S3 to obtain a chip term containing only the original signal L2, so that the original signal L2 may be obtained by calculation. A subtraction is operated between adjacent multiplexed signals S3 and S4 to obtain a chip term containing only the original signal L1, so that the original signal L1 may be obtained by calculation. Thereby, the respective original signals L1, L2 and L3 may be obtained through differential detection on only the multiplexed signals adjacent with each other, and the multiplexed signals the distance of which is the farthest are no longer detected.

It can also be seen from above that, in multiple sets of chips composed of respective chips in respective code words, only one term in differences or sums of any one set of chips and at least one set of chips among other sets of chips is not zero, and absolute values of each chips are the same and their signs are the same or opposite.

The code division multiplexing and de-multiplexing methods based on the differential coding according to the present disclosure can make the influence of the selectivity of channels when de-multiplexing small, thus improving the channel transmission quality.

Fourth Embodiment

In a future cellular system, the suppression of inter-cell interference is very important for the advancement of spectral efficiency. When there is a backhaul connection between cells, coordination between the cells can suppress the inter-cell interference. However, when there is no backhaul connection between the cells, the interference elimination at terminal side is very useful. For techniques of the interference elimination at the terminal side, it is required to obtain a channel estimation of interference channels. In a cellular system, each cell has a common pilot channel, and a terminal may obtain the corresponding channel estimation by measuring the common pilot channel of an adjacent cell. However, in some cellular system, e.g. a LTE-A system in the procedure of design, the common pilot channel is not pre-coded, but the pre-coding exists in a dedicated channel for the terminal. If the interference of the dedicated channel is estimated by using the common pilot channel, bias is caused, thus the quality of the interference elimination at the terminal side is affected. In this case, it is necessary to use demodulation reference signals (DMRS) specific to a dedicated channel to estimate the interference channel, thus the demodulation reference signals orthogonal between the cells are required to be considered.

According to the embodiment of the present disclosure, the multiple signals multiplexed by the differential code matrixes in the respective embodiments as described above may be the demodulation reference signals in resource blocks transmitted by adjacent (different) cells of a wireless communication system.

Furthermore, the transmitting device 200 according to the first embodiment of the present disclosure, which performs the code division multiplexing of the demodulation reference signals by using the multiplexing method based on the differential codes of the disclosure, may be configured at a base station of the wireless communication system. The receiving device 300 according to the second embodiment of the present disclosure, which obtains the demodulation reference signals by using the de-multiplexing method based on the differential codes of the disclosure, may be configured at a mobile terminal of the wireless communication system.

Figure 6:
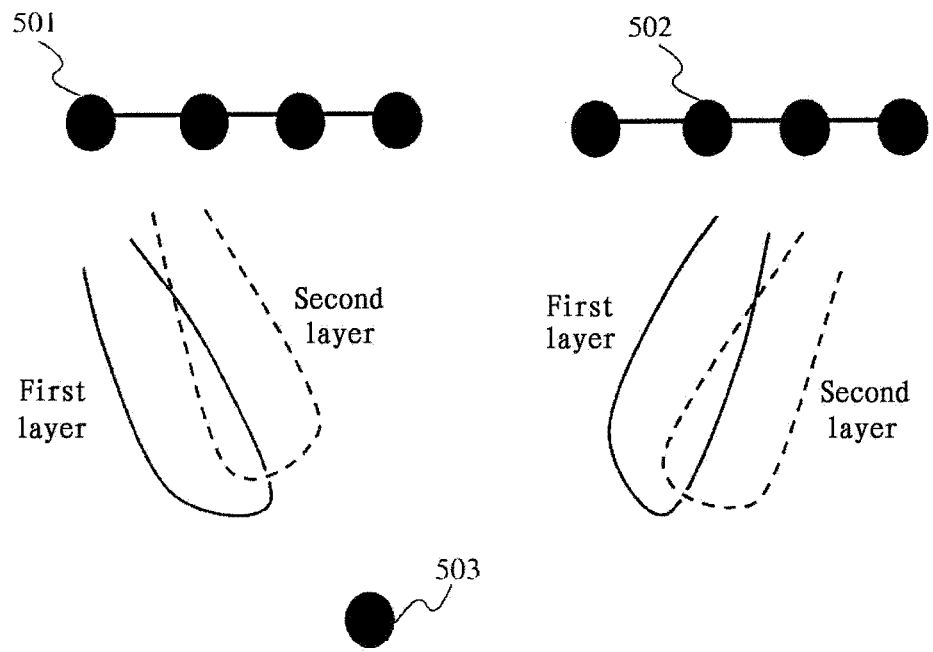
FIG. 6 is a schematic diagram showing a wireless communication system in which a base station transmits multiple data streams to a mobile terminal.

FIG. 6 is a schematic diagram showing that different base stations transmit multiple data streams to a mobile terminal in a wireless communication system.

As shown in FIG. 6, adjacent base stations 501 and 502 may include multiple antennas respectively, and transmit multiple data streams to a mobile terminal 503 in a spatial multiplexing mode respectively. The number of base stations as described above does not limit the scope of the present disclosure, and there may be multiple adjacent base stations transmitting multiple data streams to the same terminal in an actual wireless communication system.

Figure 7:
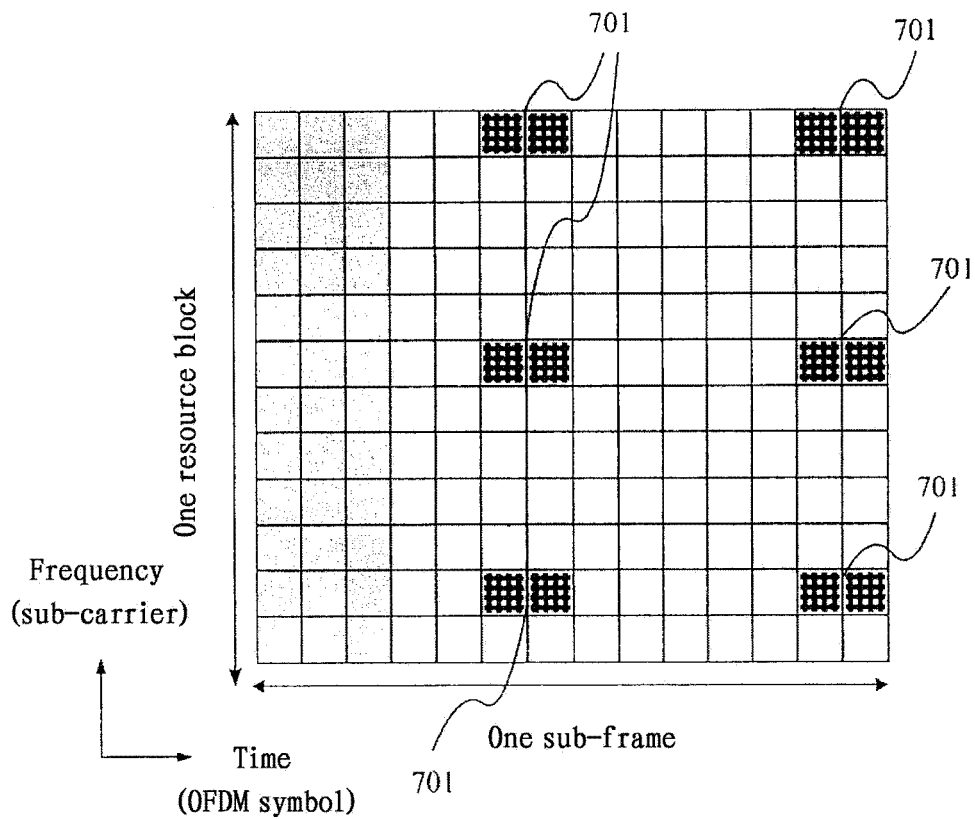
FIG. 7 is a diagram showing an example of a resource block constituting a data stream transmitted to a mobile terminal from a base station.

FIG. 7 is a diagram showing an example of a resource block constituting a data stream transmitted to a mobile terminal from a base station in a wireless communication system.

In FIG. 7, one resource block constituting the data stream is shown. A horizontal axis of the resource block represents time, while a vertical axis represents frequency bandwidth. The horizontal axis is divided into 14 segments, each of which forms one OFDM symbol along the vertical axis beginning at the horizontal axis. The vertical axis is divided into 12 segments, each of which is one sub-carrier along the horizontal axis beginning at the vertical axis. Each of small squares in the resource block represents one resource unit. All of 12×14 resource units in the resource block constitute one sub-frame on the horizontal axis. The first three columns of resource units in the resource block constitute a control region responsible for transferring control data. Other resource units represented by no pattern are used to transfer data signals. Resource units 701 represented by grid lines are used to transfer demodulation reference signals (DMRS) specific to the dedicated channel of a cell which is used to demodulate the data signals transferred in the resource block in the mobile terminal. Here, each resource block includes multiple demodulation reference signals which are distributed at predetermined positions. The number and positions of demodulation reference signals do not limit the scope of the present disclosure, and an appropriate number of demodulation reference signals may be configured at appropriate positions depending on requirements of the system.

In addition, at the same base station including multiple antennas, for example at the base station 501, multiple data streams may be transmitted to the mobile terminal 503 in a spatial multiplexing mode. The multiple data streams are located at different layers respectively, and the resource blocks of each layer of the data streams may use the same time and frequency resources. For example, the multiple antennas of the base station 501 may transmit two layers of data streams, that is, a first layer of data streams and a second layer of data streams, to the mobile terminal 503 through the spatial modulation, and the respective resource blocks in each layer of data streams may be located in the same time and frequency resources.

In a LTE-A system in the procedure of design, for the demodulation reference signals of adjacent cells, the possibility that orthogonal property between the cells is realized by Time Division Multiplexing (TDM) or Frequency Division Multiplexing (FDM) has been excluded, thus it is a code division multiplexing mode that may be employed.

Figure 8:
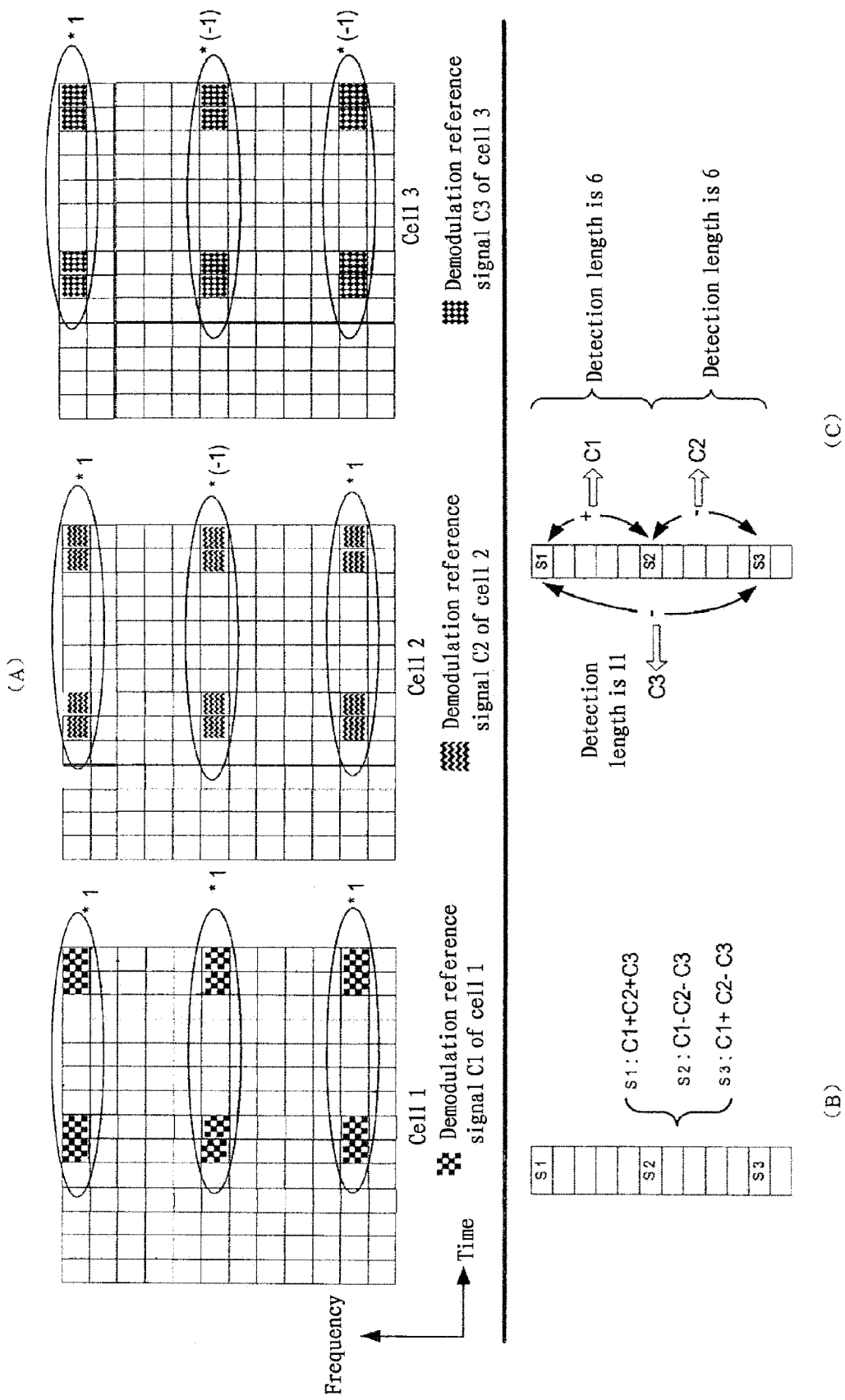
FIG. 8(A) to FIG. 8(C) are diagrams showing code division multiplexing and de-multiplexing of demodulation reference signals of adjacent cells based on a differential coding mode according to one embodiment of the present disclosure.

FIG. 8(A) to FIG. 8(C) are diagrams showing the code division multiplexing and de-multiplexing of the demodulation reference signals of adjacent cells based on the differential coding mode according to one embodiment of the present disclosure.

As shown in FIG. 8(A), the resource blocks of three adjacent cells and the demodulation reference signals therein are shown, in which the demodulation reference signal of the cell 1 is C1, the demodulation reference signal of the cell 2 is C2, and the demodulation reference signal of the cell 3 is C3. According to one embodiment of the present disclosure, the above three demodulation reference signals may be differentially multiplexed by using a differential code matrix with a length of 3 shown as follows:

$$\begin{bmatrix} 1 & 1 & 1 \\ 1 & -1 & -1 \\ 1 & 1 & -1 \end{bmatrix} \quad (6)$$

Specifically, the differential code matrix includes 3 code words which are code word 1 [1, 1, 1], code word 2 [1, −1, 1]

and code word 3 [1, −1, −1] respectively. Each code word further includes multiple chips, in which the code word 1 contains chips 1, 1 and 1, the code word 2 contains chips 1, −1 and 1, and the code word 3 contains chips 1, −1 and −1. According to one embodiment of the present disclosure, the first chips in all the code words are called as the first set of chips, the second chips in all the code words are called as the second set of chips, and the third chips in all the code words are called as the third set of chips. It can be easily seen from the equation (6) that there is only one chip term in the differences or sums of any two sets of chips, that is, there is only one term being not zero.

In the CDM multiplexing performed by the transmitting device 200 according to the present disclosure by using the above differential code matrix, different demodulation reference signals C1, C2, C3 correspond to different code words respectively. In the transmitting device 200, the multiplexing unit 202 multiplies the different demodulation reference signals by corresponding code words respectively. Specifically, each of the demodulation reference signals is multiplied by each chip of the corresponding code word, for example, the first demodulation reference signal C1 is multiplied by each chip of the code word 1 respectively to get [C1, C1, C1]; the second demodulation reference signal C2 is multiplied by each chip of the code word 2 respectively to get [C2, −C2, C2]; and the third demodulation reference signal C3 is multiplied by each chip of the code word 3 respectively to get [C3, −C3, −C3]. The results of multiplications lead to expansions of signals. The multiplexing unit 202 then adds up the expansions produced by the different signals so as to form multiplexed signals S1, S2 and S3. Specifically, the products of the respective chips in each code word and the corresponding demodulation reference signals are added up to form multiple multiplexed signals. For example, as shown in FIG. 8(B), respective product terms belonging to the first set of chips in respective code words are added up so as to obtain the multiplexed signal S1=C1+C+C3; respective product terms belonging to the second set of chips in respective code words are added up so as to obtain the multiplexed signal S2=C1−C2−C3; and respective product terms belonging to the third set of chips in respective code words are added up so as to obtain the multiplexed signal S3=C1+C2−C3. Thereby, the multiplexed signals S1, S2 and S3 are obtained.

Then the transmitting unit 206 transports the multiplexed signals S1, S2 and S3 on a wireless channel.

As shown in FIG. 8(C), in the receiving device 300 according to one embodiment of the present disclosure, the receiving unit 306 receives multiple multiplexed signals S1, S2 and S3. The de-multiplexing unit 302 adds up the adjacent multiplexed signals S1 and S2 to obtain the original demodulation reference signal C1. A subtraction is operated between the adjacent multiplexed signals S2 and S3 to obtain the original demodulation reference signal C2. A subtraction is operated between the multiplexed signals S1 and S3 the distance of which is the farthest to obtain the original demodulation reference signal C3. Thereby, the respective original demodulation reference signals C1, C2 and C3 may be obtained through the differential detection.

It can also be known from FIG. 8(C) that it is required to detect only 6 sub-carriers or a length of 6 symbols when C1 or C2 is obtained. In this way, since the span distance on time or frequency domain when the de-multiplexing is performed is short, the influence of variation of channels in time or frequency is small.

In this way, by using a differential code matrix with a length of 3, the design for the demodulation reference signals of three adjacent cells can be realized.

The code division multiplexing method based on the differential codes and the corresponding de-multiplexing method, the transmitting device and the receiving device according to the present disclosure can make the influence of the selectivity of channels when de-multiplexing is performed small, and thus the channel transmission quality is improved.

Fifth Embodiment

If a differential code matrix with a length longer than 3 is applied in the fourth embodiment, the demodulation reference signals of cells the number of which is equal to the length (number) of the differential code matrix may be multiplexed. In this case, it is required to use the same pre-coding to the resource blocks adjacent in frequency domain in every cell. That is, the multiplexing unit 202, in the same cell using the same pre-coding, takes the demodulation reference signal in the adjacent resource block as one signal of the multiple signals, the code division multiplexing of which is performed by using the differential code matrix.

Figure 9:
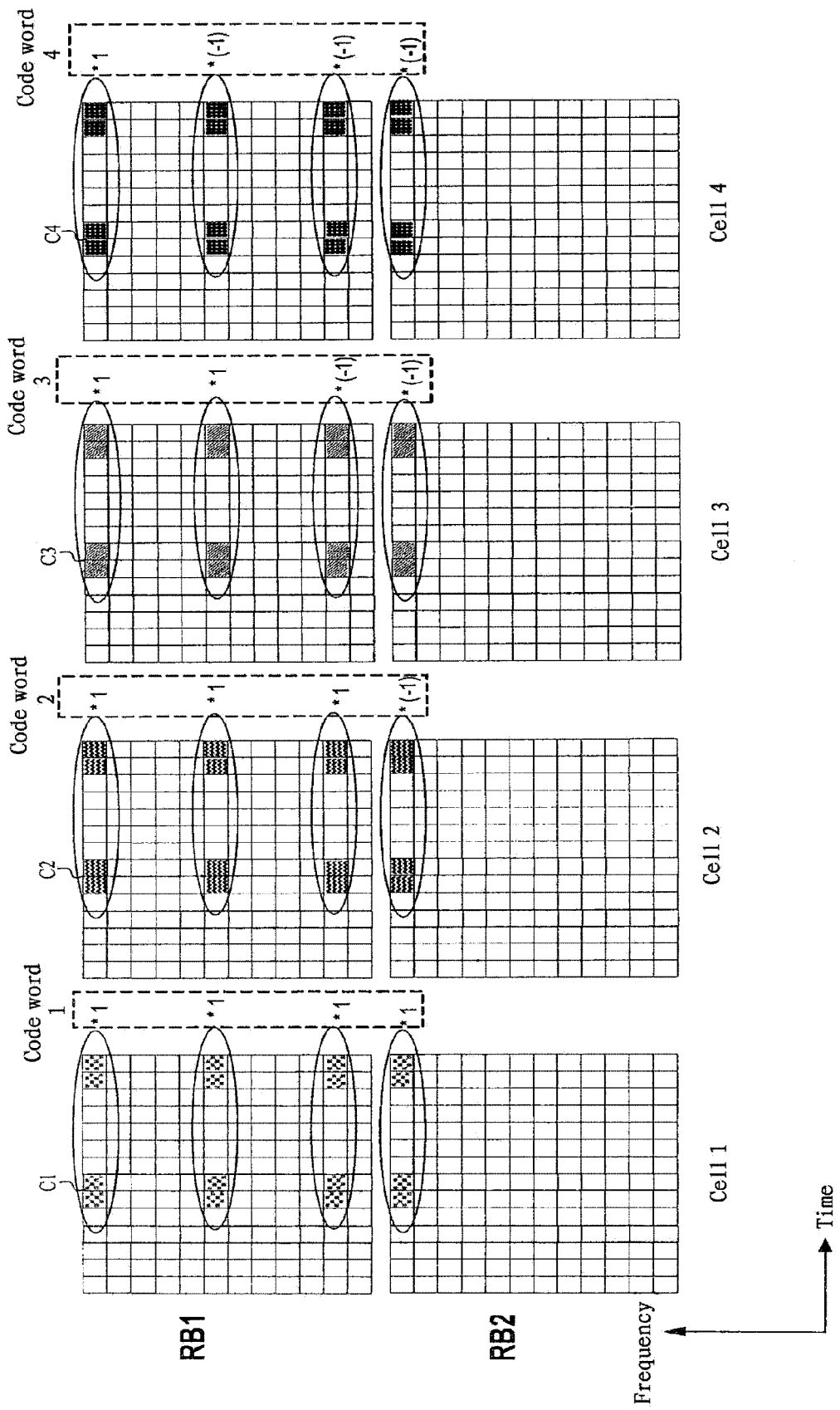
FIG. 9 is a diagram showing another example of the code division multiplexing and de-multiplexing of the demodulation reference signals of the adjacent cells based on a differential coding mode according to one embodiment of the present disclosure.

FIG. 9 is a diagram showing another example of the code division multiplexing and de-multiplexing of the demodulation reference signals of the adjacent cells based on the differential coding mode according to one embodiment of the present disclosure.

In FIG. 9, an example that four adjacent cells are multiplexed by using a differential code matrix with a length of 4 is given. In this example, two resource blocks RB1 and RB2 which are adjacent in frequency domain in each cell need to use the same pre-coding. As shown in FIG. 9, the resource blocks of four adjacent cells and the demodulation reference signals therein are shown, in which the demodulation reference signal of the cell 1 may be represented by C1, the demodulation reference signal of the cell 2 may be represented by C2, the demodulation reference signal of the cell 3 may be represented by C3, and the demodulation reference signal of the cell 4 may be represented by C4.

According to one embodiment of the present disclosure, the above four demodulation reference signals may be differentially multiplexed by using a differential code matrix with a length of 4 as shown by the equation (3), as shown by the equation (7):

$$A_{4\times 4} = \begin{bmatrix} 1 & 1 & 1 & 1 \\ -1 & 1 & 1 & 1 \\ -1 & -1 & 1 & 1 \\ -1 & -1 & -1 & 1 \end{bmatrix} \quad (7)$$

Specifically, as shown by the equation (7), the differential code matrix includes 4 code words which are code word 1 [1, 1, 1, 1], code word 2 [1, 1, 1, −1], code word 3 [1, 1, −1, −1] and code word 4 [1, −1, −1, −1] respectively. Each code word further includes multiple chips, in which the code word 1 contains chips 1, 1, 1 and 1, the code word 2 contains chips 1, 1, 1 and −1, the code word 3 contains chips 1, 1, −1 and −1, and the code word 4 contains chips 1, −1, −1 and −1. According to an embodiment of the present disclosure, the first chips in all the code words are called as the first set of chips, the second chips in all the code words are called as the second set of chips, the third chips in all the code words are called as the third set of chips, and the fourth chips in all the code words are called as the fourth set of chips. It can be easily seen that only one term is not zero in the differences of adjacent two sets of chips, and only one term is not zero in the sum of two sets of chips the distance of which is the farthest.

In the CDM multiplexing performed by the transmitting device 200 according to the present disclosure by using the above differential code matrix, different demodulation reference signals C1, C2, C3, C4 correspond to different code words respectively. The multiplexing unit 202 multiplies the different demodulation reference signals by corresponding code words respectively. Specifically, the multiplexing unit 202 of the transmitting device 200 multiplies each of the demodulation reference signals by each chip of the corresponding code word, for example, the first demodulation reference signal C1 is multiplied by each chip of the code word 1 respectively to get [C1, C1, C1, C1], the second demodulation reference signal C2 is multiplied by each chip of the code word 2 respectively to get [C2, C2, C2, −C2], the third demodulation reference signal C3 is multiplied by each chip of the code word 3 respectively to get [C3, C3, −C3, −C3], and the fourth demodulation reference signal C4 is multiplied by each chip of the code word 4 respectively to get [C4, −C4, −C4, −C4]. The results of multiplications lead to expansions of signals. The multiplexing unit 202 then adds up the expansions produced by different signals so as to form multiplexed signals S1, S2, S3 and S4. Specifically, the products of the respective chips in respective code words and the corresponding demodulation reference signals are added up to form multiple multiplexed signals. For example, respective product terms belonging to the first set of chips in respective code words are added up so as to obtain the multiplexed signal S1=C1+C+C3+C4, respective product terms belonging to the second set of chips in respective code words are added up so as to obtain the multiplexed signal S2=C1+C2+C3−C4, respective product terms belonging to the third set of chips in respective code words are added up so as to obtain the multiplexed signal S3=C1+C2−C3−C4, and respective product terms belonging to the fourth set of chips in respective code words are added up so as to obtain the multiplexed signal S4=C1−C2−C3−C4. Thereby, the multiplexed signals S1, S2, S3 and S4 are obtained.

The transmitting unit 206 transports the multiplexed signals S1, S2, S3 and S4 on a wireless channel. The above expansions of the demodulation reference signals may be performed either on time domain or on frequency domain.

In the receiving device 300 according to the present disclosure, the receiving unit 306 receives the above multiple multiplexed signals S1, S2, S3 and S4. A subtraction is operated by the de-multiplexing unit 302 between the adjacent multiplexed signals S1 and S2 to obtain the original demodulation reference signal C4. A subtraction is operated between the adjacent multiplexed signals S2 and S3 to obtain the original demodulation reference signal C3. A subtraction is operated between the adjacent multiplexed signals S3 and S4 to obtain the original demodulation reference signal C2. The multiplexed signals S1 and S4 the distance of which is the farthest are added up to obtain the original demodulation reference signal C1. Thereby, the respective original demodulation reference signals C1, C2, C3 and C4 may be obtained through the differential detection.

The code division multiplexing method based on the differential codes and the corresponding de-multiplexing method, the transmitting device and the receiving device according to the present disclosure can make the influence of the selectivity of channels when de-multiplexing is performed small, and thus the channel transmission quality is improved.

Sixth Embodiment

The present embodiment provides an improvement of the fourth embodiment. In the fourth embodiment, the differential detection of the multiplexed signals of a certain cell requires the expansions across the entire frequency domain. For example, as shown in FIG. 8(C), in order to obtain the demodulation reference signal C3, a distance of 11 sub-carriers are detected across the entire frequency domain, which goes against improving the qualities of the obtained demodulation reference signals.

FIG. 10(A) to FIG. 10(C) are diagrams showing a further example of the code division multiplexing and de-multiplexing of the demodulation reference signals of adjacent cells based on the differential coding mode according to one embodiment of the present disclosure.

As shown in FIG. 10(A), the present embodiment is different from the fourth embodiment in that the demodulation reference signals of each cell are divided into two CDM sets on the time domain with each of the sets expanded by using different differential code matrixes. In this way, for the differential detection of the demodulation reference signals of each cell, a case of spanning only 6 sub-carriers can be found, that is, the performance for the differential detection of the demodulation reference signals of each cell is more even.

Specifically, as shown in FIG. 10(A), the demodulation reference signals of each cell are divided into two sets, that is a first set and a second set, on the time domain, and the first set and the second set are respectively multiplied by different differential code matrixes. The number of the divided sets does not limit the scope of the present disclosure. The demodulation reference signals of each cell may also, if necessary in fact, be divided into multiple sets on the time domain, and the multiple sets are multiplied by multiple different differential code matrixes respectively so as to perform the code division multiplexing.

Here, for example, the first set and the second set of demodulation reference signals are multiplied by two different differential code matrixes respectively:

$$\begin{bmatrix} 1 & 1 & 1 \\ -1 & -1 & 1 \\ 1 & -1 & 1 \end{bmatrix}, \begin{bmatrix} 1 & 1 & 1 \\ 1 & -1 & -1 \\ 1 & 1 & -1 \end{bmatrix} \quad (8)$$

The 3 code words included in the first differential code matrix are the code word 1 [1, −1, 1], code word 2 [1, −1, −1] and code word 3 [1, 1, 1] respectively; the 3 code words included in the second differential code matrix are the code word 1 [1, 1, 1], code word 2 [1, −1, 1] and code word 3 [1, −1, −1] respectively.

As shown in FIG. 10(B), according to the same methods as the above embodiments, the multiplexing unit 202 of the transmitting device 200 may form a first set of multiplexed signals S1, S2, S3, in which $S1=C1+C2+C3$ $S2=-C1-C2+C3$ $S3=C1-C2+C3,$ as well as a second set of multiplexed signals S1', S2', S3', in which $S1'=C1+C2+C3$ $S2'=C1-C2-C3$ $S3'=C1+C2-C3.$ The transmitting unit 206 transports the multiplexed signals S1, S2, and S3, as well as S1', S2', and S3' on the wireless channel.

As shown in FIG. 10(C), in the receiving device 300 according to the present disclosure, the receiving unit 306 receives multiple multiplexed signals S1, S2, S3 and S1', S2', S3'. The de-multiplexing unit 302 adds up the adjacent multiplexed signals S1 and S2 to obtain the original demodulation reference signal C3, and it operates a subtraction between the adjacent multiplexed signals S2 and S3 to obtain the original demodulation reference signal C1. The de-multiplexing unit 302 also adds up the adjacent multiplexed signals S1' and S2' to obtain the original demodulation reference signal C1, and it operates a subtraction between the adjacent multiplexed signals S2' and S3' to obtain the original demodulation reference signal C2. In this way, the respective original demodulation reference signals C1, C2, C3 can be obtained through the differential detection. Furthermore, for the demodulation reference signals of each cell, it needs to perform the differential detection across only 6 sub-carriers instead of a longer distance of the frequency domain. Thereby, the performance for the differential detection of the demodulation reference signals of each cell is made more even.

The present embodiment may be applied to improve the fifth embodiment, the details of which will not be described hereinafter.

The code division multiplexing method based on the differential codes and the corresponding de-multiplexing method, the transmitting device and the receiving device according to the present disclosure can make the influence of the selectivity of channels when de-multiplexing is performed small, thus the channel transmission quality is improved.

Seventh Embodiment

In a LTE-A system, in a case that the multiple layers of data streams (the multiple layers of resource blocks) exist, Walsh codes may be used to multiplex on time domain the demodulation reference signals on the same layer of resource blocks, so that the demodulation reference signals of different layers of resource blocks are orthogonal.

Figure 11A:
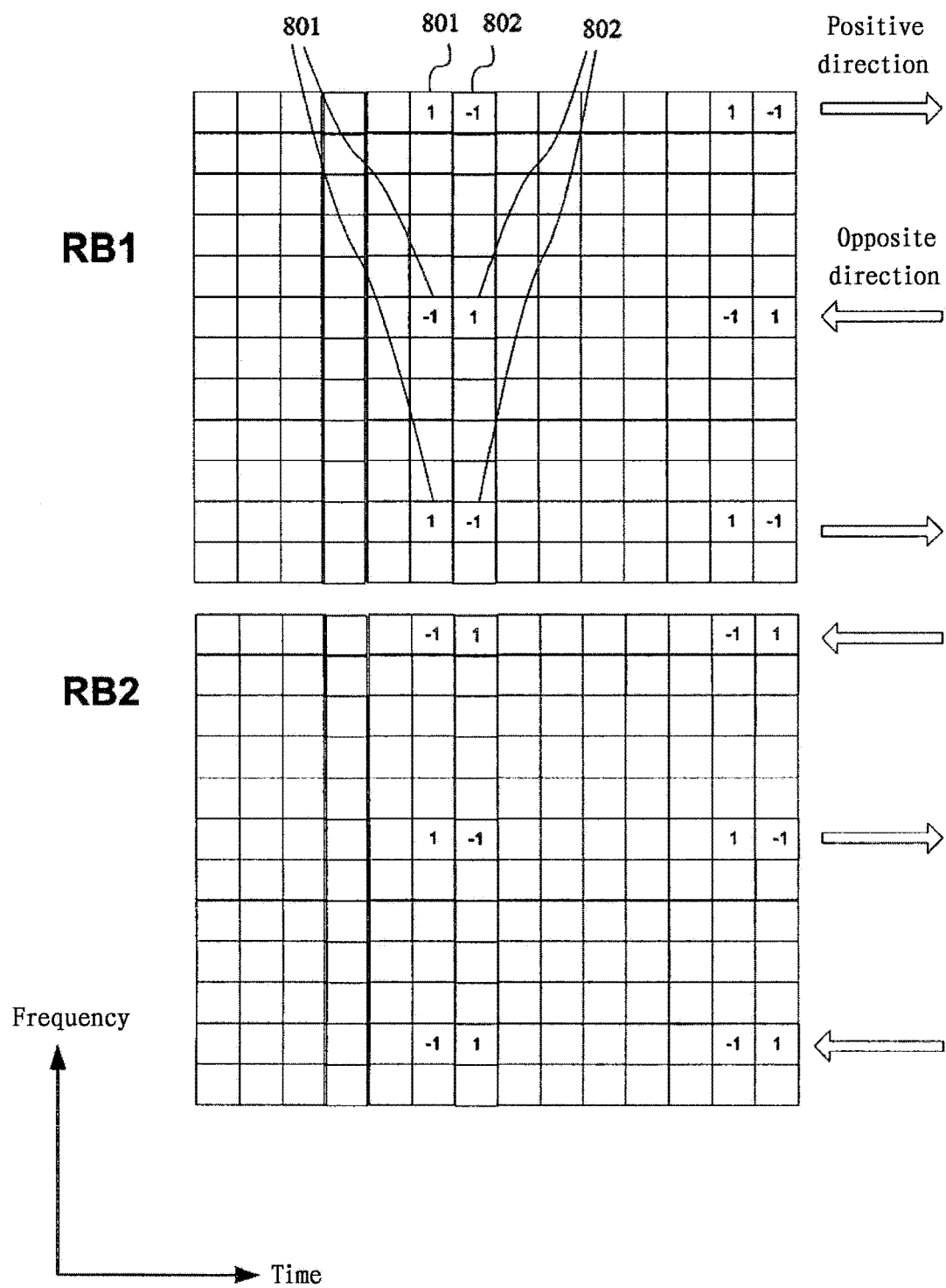
FIG. 11(A) and FIG. 11(B) are diagrams showing two resource blocks adjacent in frequency on one layer of multiple layers of resource blocks.
Figure 11B:
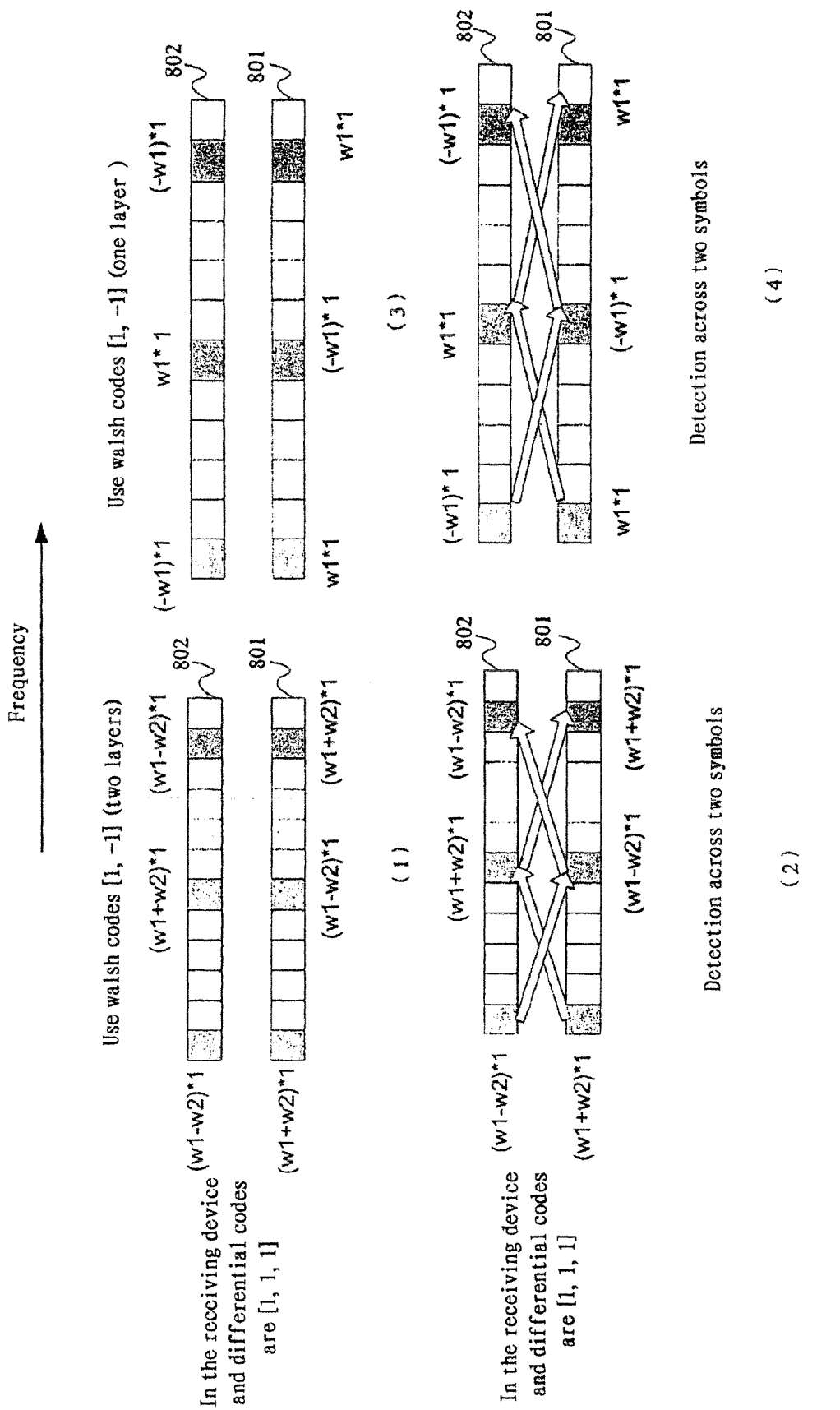

FIG. 11(A) and FIG. 11(B) are diagrams showing two resource blocks adjacent in frequency on one layer of resource blocks among multiple layers of resource blocks.

As shown in FIG. 11(A), the RB1 and RB2 are two resource blocks adjacent in frequency of the same layer of data streams respectively, in which two demodulation reference signals adjacent on time are multiplexed on time by using Walsh codes [1, −1]. In such a case, the directions of Walsh codes [1, −1] for the two demodulation reference signals adjacent on time are alternately opposite in frequency domain. In the transmitting device 200, it does not affect the way that the code division multiplexing is performed by using differential code matrixes, and the demodulation reference signals of adjacent cells can still be performed a differential coding multiplexing according to the respective embodiments as described above. That is, the multiplexing unit 202 performs the orthogonal code division multiplexing of the demodulation reference signals located in adjacent time periods in the same layer of resource blocks of a cell, and takes the demodulation reference signals subjected to such multiplexing as one of the multiple demodulation reference signals which are performed the code division multiplexing by using the differential code matrixes.

For a case of the data streams including multiple layers such as two layers, since the received multiplexed signals are constructed by superposing the demodulation reference signals located at the same positions of different layers and subjected to expansions by Walsh codes the directions of which is opposite, if the detection is performed in a normal way in the receiving device 300, the detection of the same symbol in the receiving device 300 fails to detect superposed signals whose values are identical, thus the original demodulation reference signals can not be resumed by the differential detection.

For example, RB1 shown in FIG. 11(A) is a resource block on the second layer, on which there are chips [1, −1, 1] of Walsh codes expanded on the position of a symbol 801, and there are chips [−1, 1, −1] of Walsh codes expanded on the position of a symbol 802. Further, on a resource block on the first layer which is not shown, there are chips [1, 1, 1] of Walsh codes expanded on both the positions of the symbol 801 and the symbol 802. It is assumed that a demodulation reference signal of a resource block on the first layer (not shown) is represented by w1, a demodulation reference signal of the resource block RB1 on the second layer is represented by w2, and a code word of the differential code matrix used for the demodulation reference signal on the resource block RB1 is [1, 1, 1].

At this time, as shown in (1) of FIG. 11(B), in the receiving device 300, the multiplexed signals at the position of the symbol 801 received by the receiving unit 306 are (w1+w2)*1, (w1−w2)*1 and (w1+w2)*1 respectively, and the multiplexed signals at the position of the symbol 802 are (w1−w2)*1, (w1+w2)*1 and (w1−w2)*1 respectively. Here, it should be noted that the multiplexed signals at the position of the symbol 801 contains (w1+w2)*1 and (w1−w2)*1, and the multiplexed signals at the position of the symbol 802 also contains (w1−w2)*1 and (w1+w2)*1. In order to correctly decode, the superposed signals at the same symbol position have to be the same signals. Therefore, as shown in (2) of FIG. 11(B), it is necessary to alternately detect positions for different sub-carriers in the symbol 801 and the symbol 802 in the detection of the receiving device 300 so as to obtain identical detection signals, for example, all detections at one time obtain a superposed signal (w1+w2)*1 or a superposed signal (w1−w2)*1. Thereby, the correct decoding can be performed.

As shown in (3) of FIG. 11(B), in a case that there is only one layer of resource blocks, if Walsh codes [1, −1] whose directions are alternate are also used, in the receiving device 300, the multiplexed signals at the position of the symbol 801 received by the receiving unit 306 are w1*1, (−w1)*1 and w1*1 respectively, and the multiplexed signals at the position of the symbol 802 are (−w1)*1, w1*1 and (−w1)*1 respectively. Here, it should be noted that the multiplexed signals at the position of the symbol 801 contains w1*1 and (−w1)*1, and the multiplexed signals at the position of the symbol 802 also contains w1*1 and (−w1)*1. In order to correctly decode, the superposed signals at the same symbol position have to be the same signals. Therefore, as shown in (4) of FIG. 11(B), it is necessary to, in the detection of the receiving device 300, alternately detect the multiplexed signals in the two symbols 801 and 802 received at adjacent time positions, at the positions of the received signals in the symbol 801 and the symbol 802 with respect to different sub-carrier frequencies, so as to obtain identical detection signals. For example, all detections at one time obtain a superposed signal w1*1 or a superposed signal (−w1)*1. Thereby, the correct decoding can be performed.

The code division multiplexing method based on the differential codes and the corresponding de-multiplexing method, the transmitting device and the receiving device according to the present disclosure can make the influence of the selectivity of channels when de-multiplexing is performed small, thus the channel transmission quality is improved.

Eighth Embodiment

Figure 12:
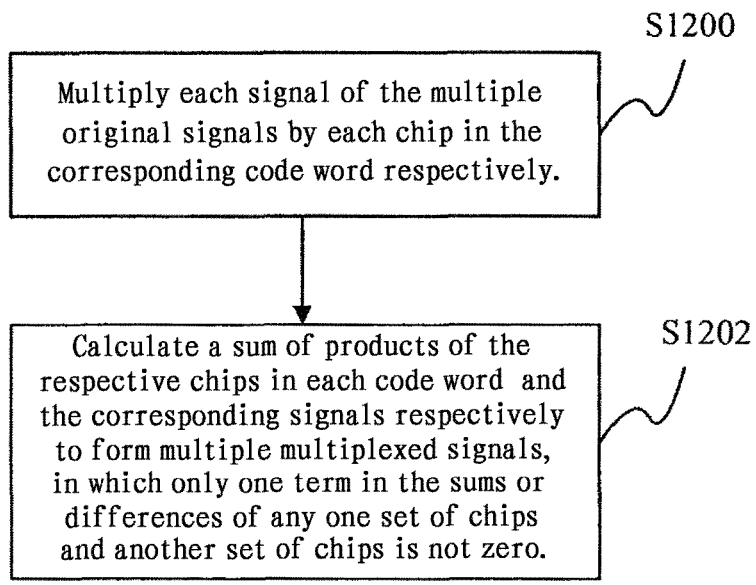
FIG. 12 is a flow chart showing a code division multiplexing method based on the differential coding according to one embodiment of the present disclosure.

FIG. 12 is a flow chart showing a code division multiplexing method based on the differential codes according to one embodiment of the present disclosure.

The code division multiplexing method based on the differential codes according to the present disclosure performs the code division multiplexing of the multiple original signals by using a differential code matrix including multiple code words the number of which is the same as the number of the multiple original signals, each code word including multiple chips. As shown in FIG. 12, at step S1200, each of the multiple original signals as described above is multiplied by each chip in the corresponding code word respectively. At step S1202, the sum of products of the respective chips in each code word and the corresponding signals is calculated to form multiple multiplexed signals. The corresponding chips of the respective code words can constitute multiple sets of chips, in which only one term in the sums or differences of any one set of chips and one set of chips among other sets of chips is not zero.

According to one embodiment of the present disclosure, the above steps S1200 and S1202 may be implemented by the multiplexing unit 202 in the transmitting device 200.

According to one embodiment of the present disclosure, the above code matrix may be a matrix A of N×M, the multiple signals may be M signals $L_1, L_2, \ldots, L_M$, the code matrix A includes M code words $[a_{i,1}], [a_{i,2}], \ldots, [a_{i,M}]$, and corresponding chips of the respective code words constitute N sets of chips $[a_{1,j}], [a_{2,j}], \ldots, [a_{N,j}]$. Here, $i=1 \ldots N$, $j=1 \ldots M$, M and N are positive integers larger than or equal to 2, and M≤N. The multiple multiplexed signals are N signals $S_1, S_2, \ldots, S_N$, in which $S_1=L_1 \times a_{1,1}+L_2 \times a_{1,2}+ \ldots +L_M \times a_{1,M}$; $S_2=L_1 \times a_{2,1}+L_2 \times a_{2,2}+ \ldots +L_M \times a_{2,M}$; $\ldots$ $S_N=L_1 \times a_{N,1}+L_2 \times a_{N,2}+ \ldots +L_M \times a_{N,M}$.

According to one embodiment of the present disclosure, only one term in the differences or sums of adjacent two sets of chips is not zero.

According to one embodiment of the present disclosure, the absolute values of each of the chips are the same, and their signs are the same or opposite.

According to one embodiment of the present disclosure, the above code matrix may be constructed as the equation (1).

According to one embodiment of the present disclosure, the multiple original signals may be demodulation reference signals in resource blocks transmitted by different cells of a wireless communication system.

According to one embodiment of the present disclosure, the above method may further includes a step of using the same pre-coding for adjacent resource blocks of the same cell, and taking the demodulation reference signals in adjacent resource blocks as one of the multiple original signals.

According to one embodiment of the present disclosure, the above method may further includes a step of dividing the demodulation reference signals of each of different cells into multiple sets, and multiplying the different sets of demodulation reference signals of all cells by different code matrixes respectively to form multiple sets of multiplexed signals.

According to one embodiment of the present disclosure, the above method may further includes a step of performing the orthogonal code division multiplexing of demodulation reference signals located in adjacent time periods in the same layer of resource blocks of one cell, and taking the demodulation reference signals subjected to such multiplexing as one of the multiple original signals as described above.

The order of executing respective steps of the above method does not limit the scope of the disclosure, and the respective steps as described above may be executed in parallel or in different orders.

The respective steps as described above may also be implemented by the multiplexing unit 202 of the transmitting device 200.

The code division multiplexing method based on the differential codes according to the present disclosure can make the influence of the selectivity of channels when de-multiplexing is performed small, thus the channel transmission quality is improved.

Ninth Embodiment

Figure 13:
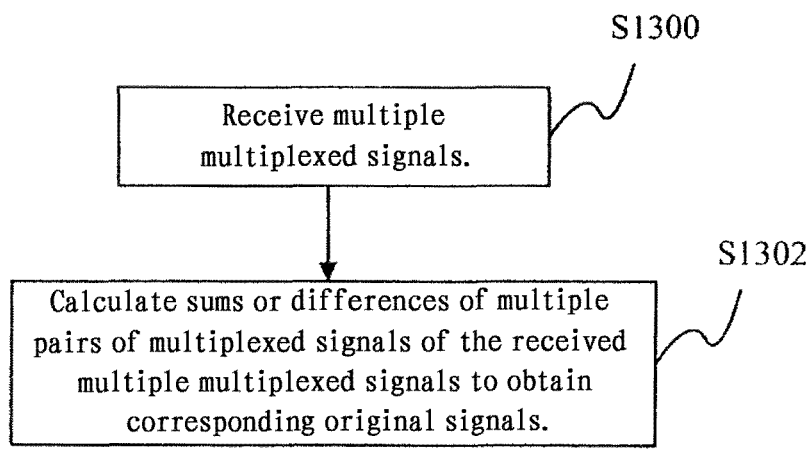
FIG. 13 is a flow chart showing a de-multiplexing method based on the differential coding according to one embodiment of the present disclosure.

FIG. 13 is a flow chart showing a de-multiplexing method based on the differential codes according to one embodiment of the present disclosure.

As shown in FIG. 13, at step S1300, the multiple multiplexed signals which are obtained by subjecting multiple signals to the code division multiplexing by using a code matrix are received. At step S1302, the sums or differences of multiple pairs of multiplexed signals in the above multiple multiplexed signals are calculated to obtain corresponding signals of the multiple signals.

According to one embodiment of the present disclosure, the above steps S1300 and S1302 may be implemented by the de-multiplexing unit 302 of the receiving device 300.

The code matrix of the de-multiplexing method according to one embodiment of the present disclosure includes multiple code words, the number of which is the same as the number of the multiple signals, with each code word including multiple chips, and the multiple multiplexed signals are obtained by multiplying each of the multiple signals by each chip of the corresponding code word respectively, and calculating the sum of products of the respective chips of each code word and the corresponding signals.

In the de-multiplexing method according to one embodiment of the present disclosure, the code matrix is a matrix A of N×M, the multiple signals are signals $L_1, L_2, \ldots, L_M$, the code matrix A includes M code words $[a_{i,1}], [a_{i,2}], \ldots, [a_{i,M}]$, and respective chips of the respective code words constitute N sets of chips $[a_{1,j}], [a_{2,j}], \ldots, [a_{N,j}]$. Here, $i=1 \ldots N$, $j=1 \ldots M$, M and N are positive integers larger than or equal to 2, and M≤N. The multiple multiplexed signals are N signals $S_1, S_2, \ldots, S_N$, in which $S_1=L_1 \times a_{1,1}+L_2 \times a_{1,2}+ \ldots +L_M \times a_{1,M}$; $S_2=L_1 \times a_{2,1}+L_2 \times a_{2,2}+ \ldots +L_M \times a_{2,M}$; $\ldots$ $S_N=L_1 \times a_{N,1}+L_2 \times a_{N,2}+ \ldots +L_M \times a_{N,M}$.

In the de-multiplexing method according to one embodiment of the present disclosure, only one term in differences or sums of adjacent two sets of chips is not zero.

In the de-multiplexing method according to one embodiment of the present disclosure, the absolute values of each of the chips are the same, and their signs are the same or opposite.

The code matrix of the de-multiplexing method according to one embodiment of the present disclosure may be constructed as the equation (1).

In the de-multiplexing method according to one embodiment of the present disclosure, the multiple signals may be demodulation reference signals in resource blocks transmitted by different cells of a wireless communication system.

In the de-multiplexing method according to one embodiment of the present disclosure, there may further be included a step of receiving multiple sets of multiplexed signals, and respectively calculating sums or differences of different pairs of multiplexed signals in each set of multiplexed signals to obtain the demodulation reference signals of different cells respectively.

In the de-multiplexing method according to one embodiment of the present disclosure, there may further be included a step of, for multiplexed demodulation reference signals at adjacent time positions in the received resource blocks, alternately detecting at the adjacent time positions with respect to different frequencies so as to obtain respective multiplexed demodulation reference signals.

The order of executing respective steps of the above method does not limit the scope of the disclosure, and the respective steps as described above may be executed in parallel or in different orders.

The respective steps as described above may also be implemented by the de-multiplexing unit 302 of the receiving device 300.

The de-multiplexing method based on the differential codes according to the present disclosure can make the influence of the selectivity of channels when de-multiplexing is performed small, thus the channel transmission quality is improved.

The above embodiments of the present disclosure are only exemplary description, and their specific structures and operations do not limit the scope of the disclosure. Those skilled in the art can combine different parts and operations in the above respective embodiments to produce new implementations which equally accord with the concept of the present disclosure.

The embodiments of the present disclosure may be implemented by hardware, software and firmware or in a combination thereof, and the way of implementation thereof does not limit the scope of the present disclosure.

The connection relationships between respective functional elements (units) in the embodiments of the present disclosure do not limit the scope of the present disclosure, in which one or multiple functional element(s) or unit(s) may contain or be connected to any other functional elements.

Although several embodiments of the present disclosure has been shown and described in combination with attached drawings as above, those skilled in the art should understand that variations and modifications which still fall into the scope of claims and their equivalents of the present disclosure can be made to the embodiments without departing from the principle and spirit of the disclosure.

What is claimed is:

1. A code division multiplexing method of performing code division multiplexing of a plurality of signals by using a code matrix, the code matrix comprising a plurality of chips and a plurality of code words, wherein each vector of a first direction of the code matrix represents one of the code words and each vector of a second direction of the code matrix represents a set of the chips, the number of code words being the same as the number of the plurality of signals, the method comprising:
   generating a plurality of products by multiplying teach signal of the plurality of signals by each chip of a corresponding code word of the plurality of code words; and
   forming a plurality of multiplexed signals by calculating a sum of the products generated from a set of chips, for each set of chips,
   wherein there is no orthogonal property between the code words of the code matrix;
   wherein only one term in a difference or sum of two sets of chips is not zero; and
   wherein the code matrix is:

$$A = [a_{i,j}]$$
$$a_{i,j} = \begin{cases} b, & i \le j \\ -b, & i > j \end{cases} \text{ or } \begin{cases} b, & i \ge j \\ -b, & i < j \end{cases}$$

wherein, b can be an arbitrary number other than zero.

2. The code division method according to claim 1, wherein the absolute values of each of the chips are the same.

3. The code division method according to claim 1, wherein the code matrix is a matrix A of N×M, the plurality of signals are M signals $L_1, L_2, \ldots, L_M$, the code matrix A comprises M code words $[a_{i,1}], [a_{i,2}], \ldots, [a_{i,M}]$, and corresponding chips of the respective code words constitute N sets of chips $[a_{1,j}], [a_{2,j}], \ldots, [a_{N,j}]$, wherein, i=1 ... N, j=1 ... M, M and N are positive integers larger than or equal to 2, and M<=N, and the plurality of multiplexed signals are N signals $S_1, S_2, \ldots, S_N$, wherein, $S_1 = L_1 \times a_{1,1} + L_2 \times a_{1,2} + \ldots + L_M \times a_{1,M}$; $S_2 = a_{2,1} \times a_{2,1} + L_2 \times a_{2,2} + \ldots + L_M \times a_{2,M}$; $\ldots$ $S_N = L_1 \times a_{N,1} + L_2 \times a_{N,2} + \ldots + L_M \times a_{N,M}$.

4. The code division method according to claim 1, wherein the plurality of signals are demodulation reference signals in resource blocks transmitted by different cells of a wireless communication system.

5. The code division method according to claim 4, further comprising a step of selecting, as one of the plurality of signals, a demodulation reference signal in a resource block adjacent to a first demodulation reference signal of the plurality of signals using the same pre-coding in the same cell as the first demodulation reference signal.

6. The code division method according to claim 4 or 5, further comprising a step of dividing the demodulation reference signals of each of the different cells into a plurality of sets, and multiplying different sets of demodulation reference signals of all the cells by different code matrixes to form multiple sets of multiplexed signals.

7. The code division method according to claim 4 or 5, further comprising a step of performing orthogonal code division multiplexing of demodulation reference signals located in adjacent time periods in the same layer of resource blocks of one cell, and selecting, as one of the plurality of signals, a demodulation reference signal on which the orthogonal code division multiplexing was performed.

8. A de-multiplexing method, comprising:
   receiving a plurality of multiplexed signals, the plurality of multiplexed signals having been obtained by performing code division multiplexing using a code matrix on a plurality of signals; and
   de-multiplexing the plurality of multiplexed signals by calculating a difference or sum of each of multiple pairs of the plurality of multiplexed signals to obtain each of the signals of the plurality of signals;
   wherein the code matrix comprises a plurality of chips and a plurality of code words, wherein each vector of a first direction of the code matrix represents one of the code words and each vector of a second direction of the code matrix represents a set of the chips, the number of code words being the same as the number of the plurality of signals, and wherein the plurality of multiplexed signals are obtained by multiplying each signal of the plurality of signals by each chip of a corresponding code word of the plurality of code words, and calculating a sum of the products generated from a set of chips for each set of chips;
wherein the absolute values of the respective chips are the same;
wherein the code matrix is:

$$A = [a_{i,j}]$$
$$a_{i,j} = \begin{cases} b, & i \leq j \\ -b, & i > j \end{cases} \text{ or } \begin{cases} b, & i \geq j \\ -b, & i < j \end{cases}$$

wherein, b can be an arbitrary number other than zero.

9. The de-multiplexing method according to claim 8, wherein there is no orthogonal property between the code words of the code matrix.

10. The de-multiplexing method according to claim 8, wherein the code matrix is a matrix A of N×M, the plurality of signals are M signals $L_1, L_2, \ldots, L_M$, the code matrix A comprises M code words $[a_{i,1}], [a_{i,2}], \ldots, [a_{i,M}]$, and corresponding chips of the respective code words constitute N sets of chips $[a_{1,j}], [a_{2,j}], \ldots, [a_{N,j}]$, wherein, i=1 . . . N, j=1 . . . M, M and N are positive integers larger than or equal to 2, and M<=N, and the plurality of multiplexed signals are N signals $S_1, S_2, \ldots, S_N$, wherein, $S_1 = L_1 \times a_{1,1} + L_2 \times a_{1,2} + \ldots + L_M \times a_{1,M}$; $S_2 = L_1 \times a_{2,1} + L_2 \times a_{2,2} + \ldots + L_M \times a_{2,M}$; . . . $S_N = L_1 \times a_{N,1} + L_2 \times a_{N,2} + \ldots + L_M \times a_{N,M}$.

11. The de-multiplexing method according to claim 8, wherein the plurality of signals are demodulation reference signals in resource blocks transmitted by different cells of a wireless communication system.

12. The de-multiplexing method according to claim 11, further comprising steps of receiving multiple sets of multiplexed signals, and calculating a difference or sum of different pairs of multiplexed signals in each set of multiplexed signals to obtain demodulation reference signals of different cells.

13. The de-multiplexing method according to claim 11, further comprising a step of when receiving multiplexed demodulation reference signals located at adjacent symbols of source blocks, obtaining multiplexed demodulation reference symbols by alternately detecting the adjacent symbols at different frequencies.

14. A transmitting device for performing code division multiplexing of a plurality of signals by using a code matrix comprising a plurality of chips and a plurality of code words, wherein each vector of a first direction of the code matrix represents one of the code words and each vector of a second direction of the code matrix represents a set of the chips, the number of code words being the same as the number of the plurality of signals, the transmitting device comprising:
a multiplexing unit for forming a plurality of multiplexed signals by generating a plurality of products by multiplying each signal of the plurality of signals by each chip of a corresponding code word of the plurality of code words, and calculating a sum of the products generated from a set of chips, for each set of chips; and
a transmitting unit for transmitting the plurality of multiplexed signals,
wherein there is no orthogonal property between the code words of the code matrix;
wherein only one term in a difference or sum of two sets of chips is not zero; and
wherein the code matrix is:

$$A = [a_{i,j}]$$
$$a_{i,j} = \begin{cases} b, & i \leq j \\ -b, & i > j \end{cases} \text{ or } \begin{cases} b, & i \geq j \\ -b, & i < j \end{cases}$$

wherein, b can be an arbitrary number other than zero.

15. The transmitting device according to claim 14, wherein the plurality of signals are demodulation reference signals in resource blocks transmitted by different cells of a wireless communication system.

16. The transmitting device according to claim 15, wherein the multiplexing unit divides the demodulation reference signals of each of the different cells into a plurality of sets, and multiplies different sets of demodulation reference signals of all the cells by different code matrixes to form multiple sets of multiplexed signals.

17. The transmitting device according to claim 15, wherein the multiplexing unit performs orthogonal code division multiplexing of the demodulation reference signals located in adjacent time periods in the same layer of resource blocks of one cell, and selecting, as one of the plurality of signals, a demodulation reference signals on which the orthogonal code division multiplexing was performed.

18. A receiving device, comprising:
a receiving unit for receiving a plurality of multiplexed signals, the plurality of multiplexed signals having been obtained by performing code division multiplexing using a code matrix on a plurality of signals; and
a de-multiplexing unit for de-multiplexing the plurality of multiplexed signals by calculating a difference or sum of multiple pairs of the plurality of multiplexed signals to obtain each of the signals of the plurality of signals;
wherein the code matrix comprises a plurality of chips and a plurality of code words, wherein each vector of a first direction of the code matrix represents one of the code words and each vector of a second direction of the code matrix represents a set of the chips, the number of code words being the same as the number of the plurality of signals, and wherein the plurality of multiplexed signals are obtained by multiplying each signal of the plurality of signals by each chip of a corresponding code word of the plurality of code words, and calculating a sum of the products generated from a set of chips for each set of chips;
wherein the absolute values of the respective chips are the same;
wherein the code matrix is:

$$A = [a_{i,j}]$$
$$a_{i,j} = \begin{cases} b, & i \leq j \\ -b, & i > j \end{cases} \text{ or } \begin{cases} b, & i \geq j \\ -b, & i < j \end{cases}$$

wherein, b can be an arbitrary number other than zero.

19. The receiving device according to claim 18, wherein the plurality of signals are demodulation reference signals in resource blocks transmitted by different cells of a wireless communication system.

20. The receiving device according to claim 19, wherein the receiving unit receives multiple sets of multiplexed signals, and the de-multiplexing unit calculates a difference or sum of different pairs of multiplexed signals in each set of multiplexed signals to obtain the demodulation reference signals of different cells.

21. The receiving device according to claim 18, wherein when receiving multiplexed demodulation reference signals located at adjacent symbols of source blocks, the de-multiplexing unit detects the adjacent time symbols at different frequencies to obtain multiplexed demodulation reference signals.

* * * * *